United States Patent
Hosoya et al.

(10) Patent No.: US 8,254,988 B2
(45) Date of Patent: Aug. 28, 2012

(54) METHOD OF CONTROLLING WIRELESS COMMUNICATION SYSTEM AND WIRELESS COMMUNICATION SYSTEM

(75) Inventors: Kenichi Hosoya, Tokyo (JP); Kenichi Maruhashi, Tokyo (JP); Naoyuki Orihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/356,093

(22) Filed: Jan. 23, 2012

(65) Prior Publication Data

US 2012/0142288 A1 Jun. 7, 2012

Related U.S. Application Data

(63) Continuation of application No. 12/537,472, filed on Aug. 7, 2009, now Pat. No. 8,126,504.

(30) Foreign Application Priority Data

Sep. 19, 2008 (JP) .................................. 2008-240156

(51) Int. Cl.
*H04M 1/00* (2006.01)
(52) U.S. Cl. ..................... 455/553.1; 455/42; 455/562.1; 375/347; 342/383
(58) Field of Classification Search .................... 455/42, 455/101, 108, 110, 550.1, 552.1, 553.1, 561, 455/562.1; 375/347, 349; 342/368, 379, 342/380, 383

See application file for complete search history.

(56) References Cited

U.S. PATENT DOCUMENTS

| 7,327,795 | B2 * | 2/2008 | Oprea ........................... 375/260 |
| 7,502,431 | B2 * | 3/2009 | Doi ............................... 375/347 |
| 7,738,924 | B2 * | 6/2010 | Nakao ......................... 455/562.1 |
| 7,916,081 | B2 * | 3/2011 | Lakkis ......................... 342/367 |
| 7,965,784 | B2 * | 6/2011 | Nakao .......................... 375/267 |
| 2007/0093274 | A1 * | 4/2007 | Jafarkhani et al. ......... 455/562.1 |

* cited by examiner

*Primary Examiner* — Nhan Le

(57) ABSTRACT

A first device transmits a training signal with a fixed beam pattern, a second device receives the training signal while scanning a beam direction, and then it obtains first AWVs each having a main beam or sub-beam beam direction in an incoming direction in the second device. Next, the first device transmits a training signal while scanning a beam direction, the second device receives the training signal with a fixed beam pattern, and then it obtains second AWVs each having a main beam or sub-beam direction in an emitting direction in the first communication device. The roles of these two devices are interchanged and similar processes are performed in order to obtain third and fourth AWVs, and then one of first AWV combinations from first and second AWVs and one of second AWV combinations from third and fourth AWVs are used for wireless communication between these devices.

11 Claims, 15 Drawing Sheets

METHOD OF CONTROLLING WIRELESS COMMUNICATION SYSTEM AND WIRELESS COMMUNICATION SYSTEM

REFERENCE TO RELATED APPLICATION

This is a continuation application of U.S. patent application Ser. No. 12/537,472 filed Aug. 7, 2009 now U.S. Pat. No. 8,126,504 and claims the benefit of its priority.

BACKGROUND OF THE INVENTION

1. Field of the Invention

The present invention relates to a wireless communication system that implements wireless communication by adaptively controlling radio beams, and a method of controlling the same.

2. Description of Related Art

Firstly, documents will be referred to in this specification are listed below.

Document 1: International Patent Publication WO/2008/090836

Document 2: Japanese Unexamined Patent Application Publication No. 2006-245986.

Document 3: Japanese Unexamined Patent Application Publication No. 2000-165959.

Document 4: United States Patent Publication No. 2007/0205943.

Document 5: K. Maruhashi et al., "60-GHz-band LTCC Module Technology for Wireless Gigabit Transceiver Applications", IEEE International Workshop on Radio-Frequency Integration Technology, Digest, pp. 131-134, December 2005.

Document 6: K. Ohata et al., "1.25 Gbps Wireless Gigabit Ethernet Link at 60-GHz-Band", IEEE MTT-S International Microwave Symposium, Digest, pp. 373-376, June 2003.

Document 7: J. F. Buckwalter et al., "An Injected Subharmonic Coupled-Oscillator Scheme for a 60-GHz Phased-Array Transmitter", IEEE Transactions on Microwave Theory and Techniques, Vol. 12, pp. 4271-4280, December 2006.

Document 8: S. Alausi et al., "A 60 GHz Phased Array in CMOS", IEEE 2006 Custom Integrated Circuits Conference, Digest, pp. 393-396, San Jose, September 2006.

Document 9: J. Capon, "High-Resolution Frequency-Wavenumber Spectrum Analysis", Proceedings of the IEEE, Vol. 57, No. 8, pp. 1408-1418, August 1969.

Document 10: K. Kumaresan et al., "Estimating the angles of arrival of multiple plane waves", IEEE Transactions on Aerosp. Electron. Syst., Vol. AES-19, pp. 134-139, January 1983.

Document 11: P. Stoica et al., "MUSIC, Maximum Likelihood, and Cramer-Rao Bound", IEEE Transactions on Acoustics, Speech, and Signal Processing, Vol. 37, No. 5, pp. 720-741, May 1989.

Document 12: R. Roy et al., "ESPRIT-Estimation of Signal Parameters Via Rotational Invariance Techniques", IEEE Transactions on Acoustics, Speech, and Signal Processing, Vol. 37, No. 7, pp. 984-995, July 1989.

Document 13: I. Lakkis et al., "IEEE P802.15 Working Group for Wireless Personal Area Networks (WPANS): TG3c Call for Proposals", 15-08-0355-00-003c, May 2008.

Document 14: K. Sato et al., "Channel model for millimeter-wave WPAN", The 18th Annual IEEE International Symposium on Personal, Indoor and Mobile Radio communications (PIMRC'07), 2007.

Document 15: "Propagation data and prediction methods for the planning of indoor radio communication systems and radio local area networks in the frequency range 900 MHz to 100 GHz," ITU-R, P. 1238-3, April, 2003

In recent years, use of wireless communication devices using wideband millimeter waves (30 GHz to 300 GHz) has become increasingly widespread. The millimeter-wave radio technology has been expected to become applicable, especially, to high-rate radio data communication in the order of gigabit, such as radio transmission of high-resolution images (for example, see Documents 5, 6 and 7).

Millimeter waves, which have high frequencies, have a high rectilinear propagation property, and therefore it poses a problem in a case where radio transmission is to be implemented indoors. In addition to the high rectilinear propagation property, the millimeter waves are also significantly attenuated by a human body or a similar object. Therefore, if a person stands between the transmitter and the receiver in a room or the like, it cannot get an unobstructed view, thus making the transmission very difficult (the shadowing problem). Since this problem results from the tact that the higher rectilinear propagation property of radio waves has become higher with increase in frequency and therefore the propagation environment has been changed, it is not limited to the millimeter waveband (30 GHz and above). Although it is not easy to clearly specify the transition frequency, it has been believed to be around 10 GHz. Meanwhile, according to recommendations of the International Telecommunications Union (Document 15), a power loss coefficient, which indicates the attenuation amount of a radio wave with respect to the propagation distance, is 22 For 60 GHz in an office, while it is 28 to 32 for 0.9 to 5.2 GHz, in offices. Considering that it is 20 in the case of free-space loss, the effects of scattering and diffraction and the like are considered to be small for higher frequencies in the order of 60 GHz.

To solve the problem described above, Document 2, for example, describes a system in which a plurality of transmission paths are provided by installing a plurality of receiving units in the receiving device, so that when one of the transmission paths between the transmitting device and the receiving units is shielded, the transmission is carried out with another transmission path. Furthermore, as another method for solving the problem, Document 3 describes a contrivance to secure a plurality of transmission paths by installing reflectors on a ceiling and walls.

In the method described in Document 2, it is very difficult to continue the communication when shielding occurs in the vicinity of the transmitting device or Wien all of the installed receiving units are shielded. Meanwhile, the method described in Document 3 requires users to consider particular conditions such as a condition that reflectors need to be installed with taking the positions of the transmitter and the receiver into account.

However, recent studies on propagation properties of millimeter waves have found out that reflected waves could be utilized without intentionally installing reflectors. FIG. 16 shows a configuration of a system using a wide-angle antenna. FIG. 17 shows an example of a delay profile of a system using a wide-angle antenna like the one shown in FIG. 16 when the system is used indoors. In the system using a wide-angle antenna like the one shown in FIG. 16, the received power is maximized when the main wave, which is arrives faster than any other waves, arrives at the receiver as shown in FIG. 17. After that, although delayed waves, such as second and third waves, also arrive, the received power of these waves is smaller than that of the main wave. These second and third waves are waves reflected from the ceiling and the walls. This situation is remarkably different from the propagation environment of radio waves having a lower rectilinear propagation property, such as a 2.4 GHz band used in wireless LANs (Local Area Networks). In the 2.4 GHz band, it is very difficult to clearly separate waves in their incoming directions (DoAs: Directions of Arrival) because of the effects of diffraction and multiple reflections. On the other hand, in the millimeter waves having a high rectilinear propagation property, although radio waves are relatively clearly distinguished in their incoming directions, the number of delayed waves is limited and their received-signal levels are small.

Therefore, when the direct wave (main wave) is shielded, it is necessary to ensure a sufficient received-signal level at the receiver by pointing a narrow beam having a high directive gain to the incoming direction of a reflected wave as shown in FIG. 15 in order to continue the transmission by using the reflected wave. However, in order to eliminate the necessity for users in west to the particular conditions such as a condition for the relative positions of the transmitter and receiver, a beam forming technique capable of dynamically controlling the direction of a narrow beam is indispensable.

In the beam forming, it is necessary to construct an antenna array. For millimeter waves having a short wavelength (e.g., 5 mm in the case of a frequency of 60 GHz), the antenna array can be implemented in a small area. Phase shifter arrays and oscillator arrays for use in such antenna arrays for millimeter waves have been developed (for example, see Documents 7 and 8).

Furthermore, a DoA (Direction of Arrival) estimation technique has been known as a technique for a different purpose from the beam forming using an antenna array. The DoA estimation technique is a technique for use in, for example, radars, sonar, and propagation environment measurements, and used for estimating the incoming directions and the power of radio waves to be received at antenna arrays with high accuracy. Various methods including a beam former method and Capon method (Document 9), a linear estimation method, a minimum norm method (Document 10), MUSIC (Multiple Signal Classification) (Document 11), and ESPRIT (Estimation of Signal Parameters via Rotational Invariance Techniques) (Document 12) have been known as an algorithm used for such techniques.

When this DoA estimation technique is used in propagation environment measurement with an installed radio wave source, an omni-antenna (nondirectional antenna) is often used as the radio wave source. Document 14 shows an example of such a technique.

The present inventors have found that, when the direct wave is shielded and the radio transmission is to be continued by using a reflected wave in indoor millimeter-wave systems, a following problem arises.

When the wave (direct wave, reflected wave) that is actually used is switched, it is desirable to minimize the time during which the transmission is disconnected (hereinafter called "transmission-disconnected tine"). Such minimization of the transmission-disconnected time becomes especially an important requirement, for example, in the transmission of non-compressed images for which real-time capability is required. Meanwhile, when a reflected wave is used, it is necessary to increase the directive gain of the antenna, and thereby to increase the recent ion strength, by narrowing the antenna beam width.

However, the directions (steps) in which the searches need to be carried out increases as the beam width becomes narrower. Therefore, the time necessary to find and establish the beam direction with which the incoming wave is effectively received becomes longer, and therefore the transmission-disconnected time also becomes longer. Accordingly, it has been desired to develop a beam direction setting method that can shorten the transmission disconnected time even in such situations. It should be noted that even the use of an apparatus capable of temporally storing data is impractical because a huge buffer memory is required when the transmission-disconnected time becomes longer.

FIG. 4 shows a configuration example of a transmitting/receiving device used in the beam forming. Note that circuits unnecessary for the explanation of the operation are omitted in the figure. It has M transmitting antennas and N receiving antennas. A transmitter 401 includes a transmitter circuit 403 to which external data is input. The output of transmitter circuit 403 is branched into M signals, and they are input to the respective AWV (array weight vector) control circuits 404-1-404-M. Each signal is changed either in its amplitude or in its phase, or both in its amplitude and in its phase in the corresponding AWV control circuit, and finally output through a transmitting antenna array composed of respective antenna elements 405-1-405-M. Each of the AWV control circuits 404-1-404-M can be implemented by, for example, the series connection of an analog phase shifter and a variable-gain amplifier. In such a configuration, both the amplitude and phase of a signal may be controlled in a continuous manner. Furthermore, when the AWV control circuits 404-1-404-M are implemented by digital phase shifters, only the phases of signals are controlled in a discrete manner. AWVs that are controlled by the AWV control circuits 404-1-404-M are, in general, expressed as the following expression (1):

$$\vec{W} = [w_1, w_2, \ldots, w_M]^T \quad (1)$$

where w1, w2, ... wM are complex numbers and the superscript T indicates transposition. Furthermore, when only the phases are controlled, the expression (1) can be expressed as the following expression (2):

$$\vec{W} = [e^{j\theta_1}, e^{j\theta_2}, \ldots, e^{j\theta_M}]^T \quad (2)$$

where θ1, θ2, ... θM are phase control amounts.

Furthermore, a process/arithmetic circuit 406 provides instructions on the AWV setting of the AWV control circuits 404-1-404-M through a control circuit 407. With the change in both of the amplitude and phase or either one of them that is made to each signal, it is possible to control the direction and the width of the beam emitted from the transmitter.

Meanwhile, a receiver 402 has a reversed configuration with respect to the transmitter 401. Signals received by a receiving antenna array composed of respective antenna elements 411-1-411-N are adjusted in both of amplitudes and phases or either ones of them in AWV control circuits 410-1-419-N, and they are combined. Then, received data decoded from the combined signal is externally output through a receiver circuit 409. As in the case of the transmitter 401, a process/arithmetic circuit 406 controls both of the amplitude and phase or either one of them for each of the AWV control circuits 410-1-419-N.

FIG. 5 is a conceptual diagram of a wireless communication system composed of two transmitting/receiving devices (400 and 500) each having the configuration shown in FIG. 4. The transmitting/receiving device 500 has K transmitting antennas and L receiving antennas.

Characteristics of a propagation path between two communication devices are expressed by a channel state information (CSI) matrix. It has been known that if this CSI matrix is determined, the optimal phase combination of the antenna array of the transmitting/receiving device can be obtained by using the SVD (Singular-Value Decomposition). However on the other hand, since the SVD is complex and requires a long processing time, it is very difficult to implement it for a transmission apparatus in which high-rate processing is required.

Accordingly, Document 4, for example, discloses a method for obtaining an optimal AWV with which the signal strength is maximized by adding a unitary matrix (e.g., Hadamard matrix) as phases of the antenna array and repeating the training of the antenna array of the transmitter and the training of the antenna array of the receiver. Although this method can reduce the processing time in comparison to the SVD, it still requires a certain time to obtain the optimal AWV combination since the method carries out the switching between the transmission and the reception repeatedly.

Meanwhile, Document 13 discloses a technique to optimize a transmitting/receiving beam direction by gradually increasing the beam resolution. However, this technique also requires measuring communication quality for a number of combinations of the transmitting/receiving beam directions by repeatedly carrying out the switching between the transmission and the reception, and thereby requiring a huge amount of time to obtain an optimal beam combination.

Furthermore, this document also brings up an idea called "quasi-omni (pseudo-nondirectional) pattern" as a beam having the lowest resolution. This quasi-omni pattern means a pattern having a substantially constant antenna gain over a very wide angle in the space around the transmitting/receiving device, though it is not a complete omni (nondirectional) pattern. Since it is often very difficult to obtain a complete omni pattern with millimeter-wave antenna arrays, this quasi-omni pattern is often used as a substitute in such cases.

When a link is to be established at the initial stage, it would be acceptable if the acquisition of an optimal AWV combination requires a long time. However, in a case where a link needs to be re-established when disconnection of the transmission occurs in the previously-established link, it is necessary to search for another optimal AWV combination in a short time. Furthermore, in the case of multipoint communication, a speedy search for an optimal AWV combination is also required because it requires the re-establishment of a plurality links.

SUMMARY

An exemplary object of the present invention is to provide a radio control method capable of reducing the time necessary to find and establish a beam direction and shortening the transmission-disconnected time when the wireless communication is implemented by performing beam forming.

A first exemplary aspect of the invention is a method of controlling a wireless communication system in which a plurality of communication devices perform communication. Each communication device has an antenna array, and an array weight vector (AWV) control circuit that changes at least one of an amplitude and a phase of a signal that is transmitted from antenna elements constituting the antenna array or received at the antenna elements. The control method includes the following processes (a) to (f) that are carried out when the method independently controls AWVs of at least two antenna elements among the plurality of antenna elements. The processes (a) to (f) are:

(a) setting a fixed beam pattern in the antenna array possessed by a first communication device included in the plurality of communication devices, and transmitting a training signal from the first communication device;

(b) receiving the training signal in a second communication device included in the plurality of communication devices while scanning a beam direction by changing an AWV of the antenna array possessed by the second communication device;

(c) obtaining a data string describing a relation between an incoming direction and a received-signal characteristic in the second communication device based on a reception result of the training signal;

(d) obtaining first AWVs having a main beam direction or a sub-beam direction in an incoming direction of plural or single signal in the second communication device, the incoming direction of plural or single signal being determined by using the data string;

(e) obtaining second AWVs having a main beam direction or a sub-beam direction in an incoming direction of plural or single signal in the first communication device by carrying out the steps (a) to (d) after the transmitting operation and the receiving operation of the training signal are interchanged between the first and second communication devices; and (f) using an AWV combination of one of the first AWVs and one of the second AWVs for communication between the first and second communication devices.

A second exemplary aspect of the invention is a method of controlling a wireless communication system similar to but different from the method according to a first exemplary aspect of the invention, the method including following processes (a) to (g):

(a) carrying out a receiving operation by a first communication device included in the plurality of communication devices, and setting a fixed beam pattern in an antenna array of the first communication device;

(b) emitting a training signal by a second communication device included in the plurality of communication devices while scanning a beam direction by changing an AWV of an antenna array of the second communication device;

(c) feeding received signal data indicating a reception result of the training signal measured in the first communication device back to the second communication device;

(d) creating a data string describing a relation between an emitting direction (DoD: Direction of Departure) of a signal in the second communication device and a received-signal characteristic in the first communication device based on the received signal data;

(e) obtaining first AWVs having a main beam direction or a sub-beam direction in an emitting direction of plural or single signal, the emitting direction of plural or single signal being determined by using the data string;

(f) obtaining second AWVs having a main beam direction or a sub-beam direction in an emitting direction of plural or single signal in the first communication device by carrying out the steps (a) to (e) after the transmitting operation and the receiving operation of the training signal are interchanged between the first and second communication devices; and (g) using an AWV combination of one of the first AWVs and one of the second AWVs for communication between the first and second communication devices.

A third exemplary aspect of the invention is a method of controlling a wireless communication system including first and second communication devices. The first communication device includes an antenna array, and array weight vector (AWV) control circuit that changes at least one of an amplitude and a phase of a signal that is transmitted from a plurality of antenna elements constituting the antenna array or received at the plurality of antenna elements. Meanwhile, the second communication device uses a fixed beam pattern. The method includes the following processes (a) to (d):

(a) operating the first communication device for reception and scanning a beam direction by changing an AWV of the antenna array in a state where a training signal is being transmitted from the second communication device;
(b) obtaining a data string describing a relation between an incoming direction and a received-signal characteristic in first communication device based on a reception result of the training signal;
(c) obtaining first AWVs having a main beam direction or a sub-beam direction in an incoming direction of plural or single signal in the first communication device, the incoming direction of plural or single signal being determined by using the data string;
(d) using one of the first AWVs for communication between the first and second communication devices.

A fourth exemplary aspect of the invention is a method of controlling a wireless communication system similar to but different from the method according to a third exemplary aspect of the invention, the method including following processes (a) to (e):

(a) operating the first communication device for transmission and emitting a training signal while scanning a beam direction by changing an AWV of the antenna array in a state where the second communication device is operating for reception;
(b) feeding received signal data indicating a reception result of the training signal measured in the second communication device back to the first communication device;
(c) creating a data string describing a relation between an emitting direction of a signal in the first communication device and a received-signal characteristic in the second communication device;
(d) obtaining first AWVs having a main beam direction or a sub-beam direction in an emitting direction of plural or single signal, the emitting direction of plural or single signal being determined by using the data string;
(e) using one of the first AWVs for communication between the first and second communication devices.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENT

<First Exemplary Embodiment>

Figure 5:
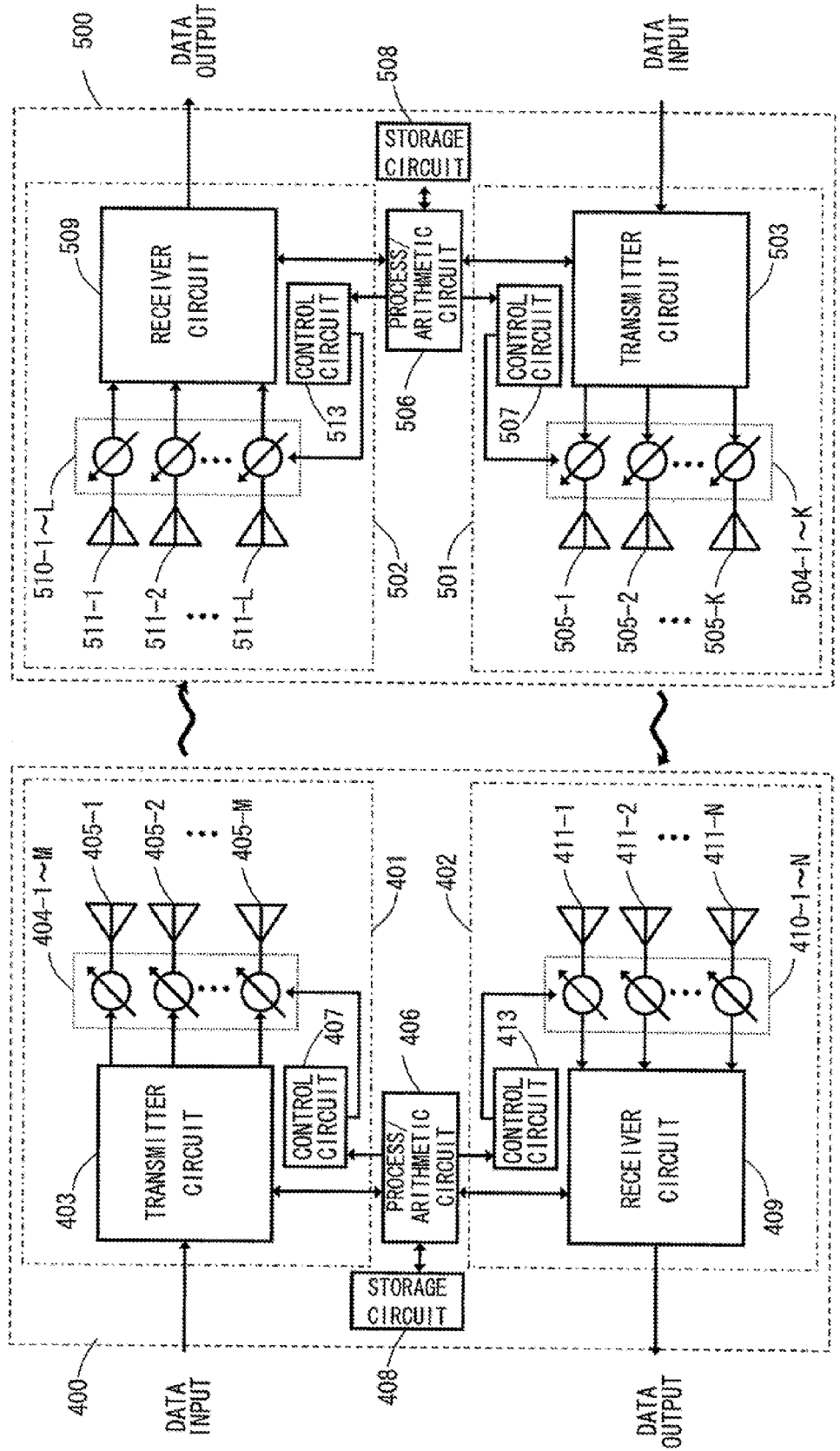
FIG. 5 a schematic view for illustrating a wireless communication system composed of two transmitting/receiving devices.

A first exemplary embodiment of the present invention is explained hereinafter with reference to a transition diagram shown in FIG. 1. It should be noted that a device configuration shown in FIG. 5, for example, can be used as a device configuration of the wireless communication system in accordance with this exemplary embodiment.

Figure 1:
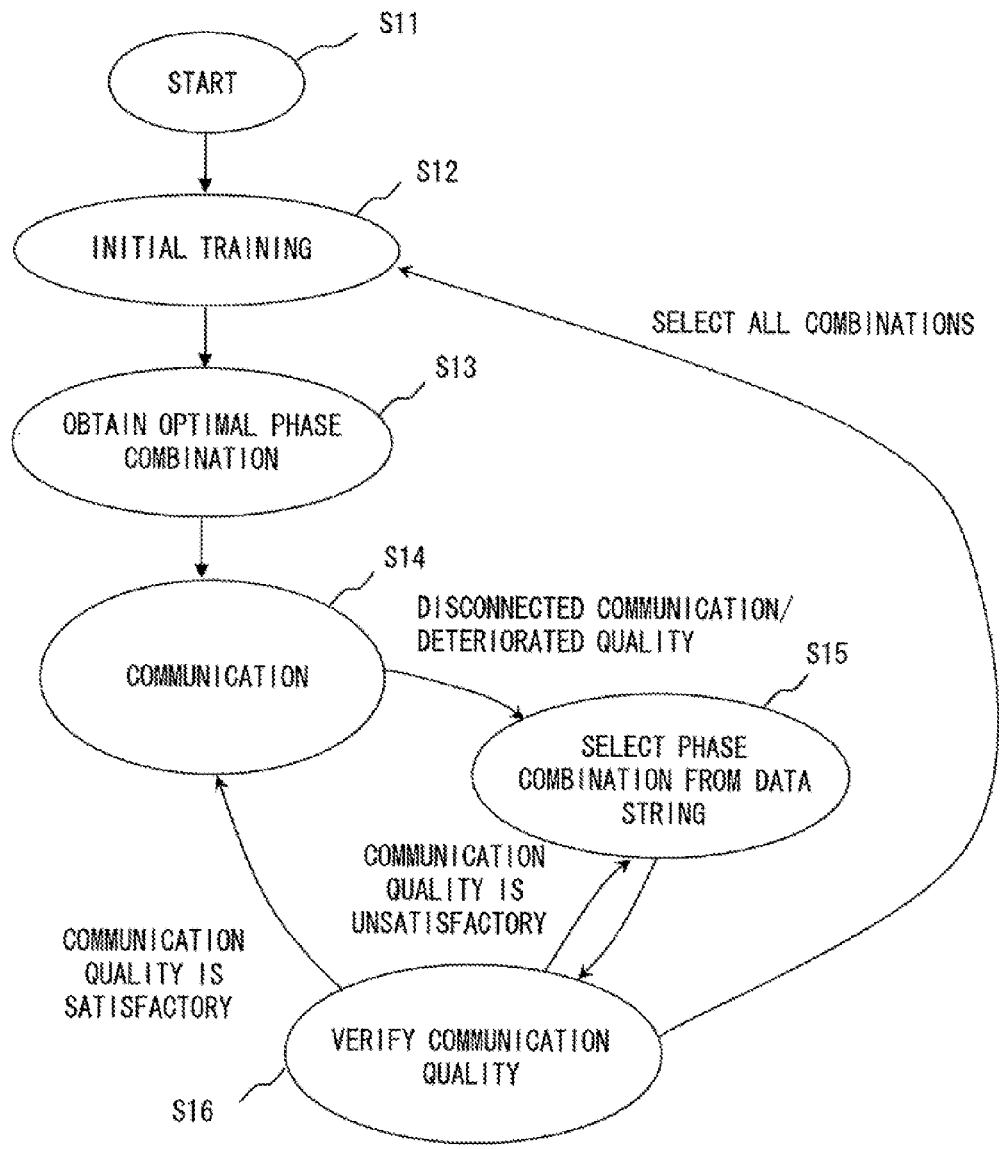
FIG. 1 shows transitions in radio control procedure in accordance with a first exemplary embodiment of the present invention.

In a state S12 in FIG. 1, transmitting/receiving devices 400 and 500 perform initial training to optimize AWV control circuits 404-1-404-M, 410-1-410N, 504-1-504K, and 510-1-510L installed therein. In a state S13, a plurality of candidate AWV combinations are calculated by a process/arithmetic circuit 406 or 506 or by cooperation of these two circuits. The calculation method for a plurality of candidate AWV combinations in the state S13 will be explained later. The obtained plurality of candidate AWV combinations are stored as a data string in both storage circuits 408 and 508 or in either one of them.

In a state S14, one of the plurality of candidate AWV combinations obtained in the state S13 is selected, and communication is performed by using the selected combination. The way of selecting an AWV combination is also explained later. The transmitting/receiving devices 400 and 500 monitor the communication state while the communication is maintained. For example, when the transmitting/receiving device 500 is operated in the receiving mode, this monitoring is implemented by measuring the communication quality in the receiver circuit 509 or in the process/arithmetic circuit 506. For example, communication quality such as a received-signal level, an SNR (Signal to Noise Ratio), a BER (Bit Error Rate), a PER (Packet Error Rate), and a FER (Frame Error Rate) may be measured. Meanwhile, the monitoring of a communication state in the transmitting/receiving device 400, which is operated as a transmitter at this case, may be implemented by measuring a reception situation of a communication quality deterioration alert or a reception acknowledgement (ACK) from the transmitting/receiving device 500. It should be noted that since publicly-known common techniques may be used for the monitoring technique for a communication state, detailed explanation of the monitoring technique in this exemplary embodiment is omitted.

When deterioration in the communication quality such as disconnected communication is detected while the communication is maintained, the transmitting/receiving devices 400 and 500 select another AWV combination from the data string stored in both storage circuits 408 and 508 or either one of them (in a state S15).

In a state S16, it is determined whether the quality of the communication using the newly selected AVW combination is satisfactory or not. In a case where the transmitting/receiving device 500 is operated in the receiving mode, for example, the pass/fail of the communication quality is determined by measuring a received-signal level, an SNR, or the like at the receiver circuit 509 or process/arithmetic circuit 506. If the communication quality is determined to be satisfactory in the state S16, the transmitting/receiving devices 400 and 500 return to the communication state (S14). On the other hand, if the communication quality is determined to be unsatisfactory in the state S16, the transmitting/receiving devices 400 and 500 goes to the state S15 and select another AWV combination again.

If no AWV combination with which the communication state is satisfactory is found from the AWV combinations stored in the storage circuits 408 and 508, the process returns to and repeats from the initial training (S12).

Next, procedure for the initial training in the state S12 shown in FIG. 1 and procedure to obtain a plurality of candidate AWV combinations in the state S13 are explained hereinafter.

Firstly, the transmitting/receiving device 400 is operated for transmission, and its AWV is established so as to generate an omni or quasi-omni pattern. The transmitting/receiving device 400 transmits a training signal in that state. The training signal arrives at the transmitting/receiving device 500 through a plurality of propagation paths.

At this point, the transmitting/receiving device 500 is operated in the receiving mode. The transmitting/receiving device 500 operates its antenna array 510-1-510-L, receiver circuit 509, control circuit 513, process/arithmetic circuit 506 together in such a manner that they scans a beam direction by changing the AWV of the antenna array and obtains a data string describing a relation between the incoming direction and received power of a signal in the transmitting/receiving device 500, which is operated in the receiving mode. In doing so, the control of an AWV and the acquisition of a data string maybe carried out by using an incoming direction estimation algorithm. The incoming direction estimation algorithm is a technique for use in, for example, radars, sonar, and propagation environment measurements. Various algorithms including a beam former method and Capon method (Document 9), a linear estimation method, a minimum norm method (Document 10), MUSIC (Multiple Signal Classification) (Document 11), and ESPRIT (Estimation of Signal Parameters via Rotational Invariance Techniques) (Document 12) have been known as an algorithm used for such techniques. Since angular resolution, power estimation accuracy, and computation amount and the like are different between these algorithms, a suitable algorithm should be selected according to the system to which the present invention is applied. Although a case where the beam former method and Capon method are used is explained hereinafter as a representative example, other incoming direction estimation algorithms may be also used. Furthermore, it is also possible to use algorithms other than the incoming direction estimation algorithms. Furthermore, although a data string describing a relation between an incoming direction and received power is obtained in the above-described example, other received-signal characteristics may be used as a substitute for the received power. Examples of the received-signal characteristics other than received power include an SNR (Signal to Noise Ratio) and the like.

Figure 6:
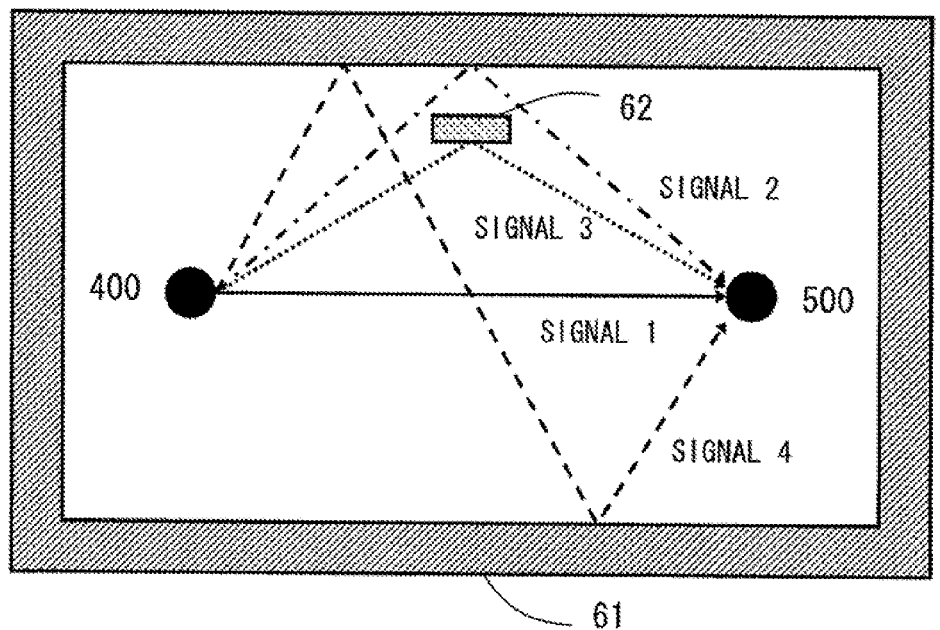
FIG. 6 is a plane view illustrating an example of propagation environment to which the present invention can be applied.
Figure 7:
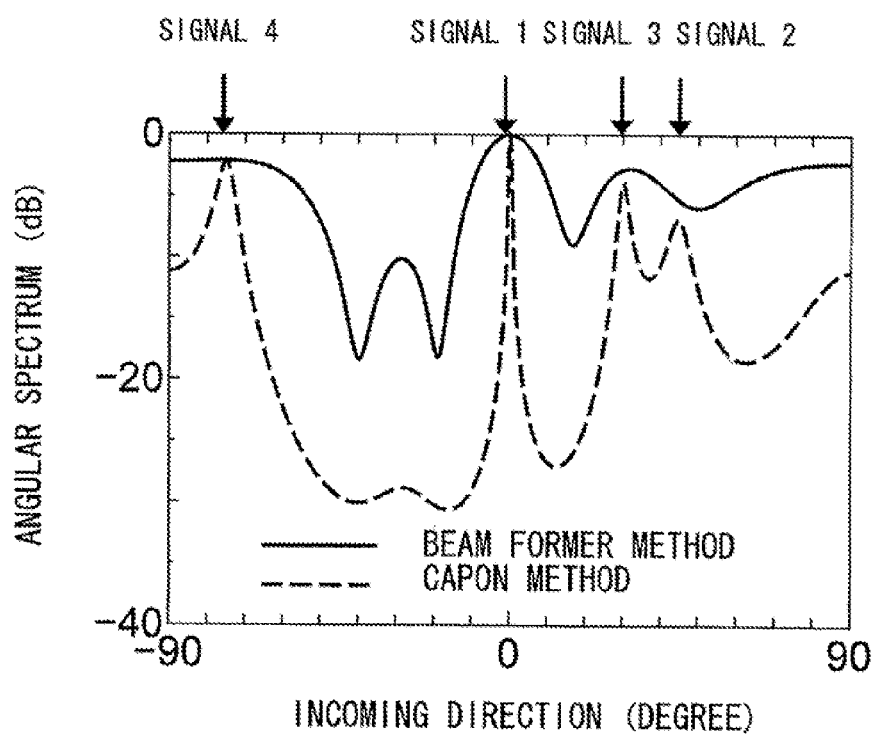
FIG. 7 is a graph showing an example of an angle profile obtained during control procedure in accordance with an exemplary aspect of the present invention.

For example, assume propagation environment like the one shown in FIG. 6. In the example shown in FIG. 6, the transmitting/receiving devices 400 and 500 and a reflective body 62 are disposed in a room (two dimensions) enclosed with a wall 61. Assume that there are four propagation paths indicated by signals 1-4 between the transmitting/receiving devices 400 and 500 as available paths for communication. By performing an incoming direction estimation algorithm, data strings indicating relations between received-signal power and incoming directions like the ones illustrated in FIG. 7 are obtained. The angular spectrum means values indicating received power ratios among signals incoming from different directions. FIG. 7 shows angular spectra in a case where the beam former method and Capon method are used as examples.

Note that planar (two-dimensional) propagation environment as shown in FIG. 6 is assumed for simplifying the explanation, and therefore the horizontal axis in FIG. 7 indicates values in one dimension. It is also assumed that the antenna array has one dimension. However, this exemplary embodiment of the present invention can be also applied to other cases where a 2D (two-dimensional) antenna array is used in three-dimensional (3D) propagation environment. In such cases, the horizontal axis in FIG. 7 becomes a 2D array composed of two angles.

The process/arithmetic circuit 506 identifies signals in order of the received power by performing peak searches using the data string of the obtained angular spectrum. In this process, it is possible to terminate the identification process at the point when a predetermined number of signals are identified. Next, the process/arithmetic circuit 506 calculates AWVs used to point the main beam or a sub-beam to the incoming direction of the respective signals, and stores these AWVs in the storage circuit 508 in order of the received power. In this process, AWVs for the AWV control circuits 510-1-510-L of the receiver 502 and AWVs for the AWV control circuits 504-1-504-K of the transmitter 501 are both calculated. When the transmitting/receiving device 500 is operated in the receiving mode, the former is used, and when it is operated for transmission, the latter is used. Furthermore, instead of newly calculating AWVs, it is possible to select AWVs with which the main beams or a sub-beam is pointed to the corresponding incoming direction from the AWVs that were used in the beam scan process of the state S12.

Figure 8:
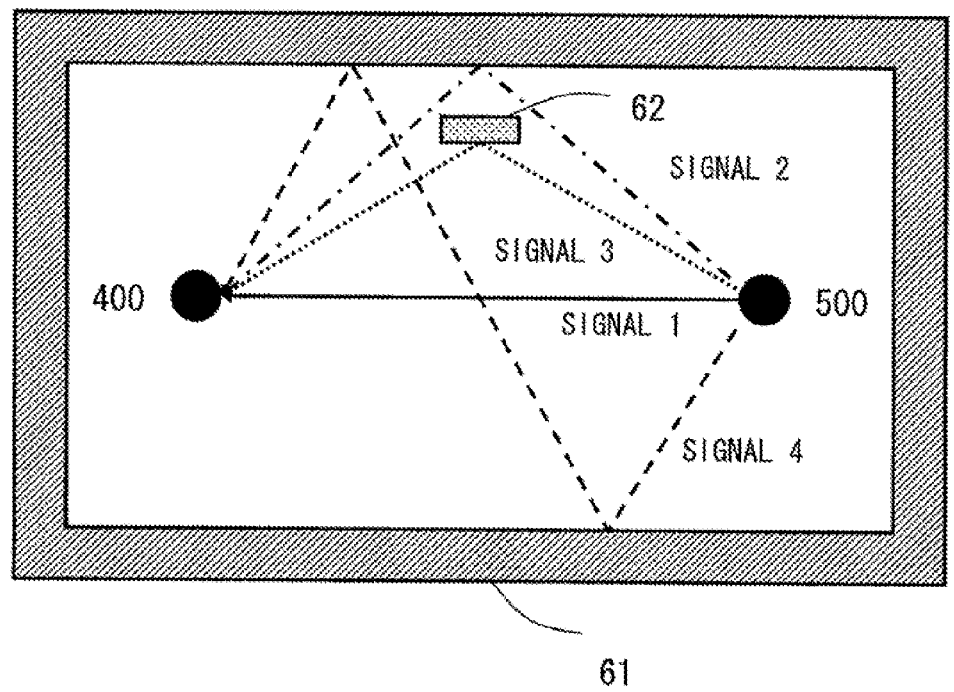
FIG. 8 a plane view illustrating an example of propagation environment to which the present invention can be applied.

Next, the roles of the transmitting/receiving devices 400 and 500 are interchanged, and similar processes are performed. That is, the transmitting/receiving device 500 is operated for transmission, and its AWV is established so as to generate an omni or quasi-omni pattern. The transmitting/receiving device 500 transmits a training signal in that state. The training signal arrives at the transmitting/receiving device 400 through a plurality of propagation paths. At this point, there are four propagation paths as available paths for communication as shown in FIG. 8, and the directions of these propagation paths are opposite to those shown in FIG. 6.

At this point, the transmitting/receiving device 400 is operated in the receiving mode and implements an incoming direction estimation algorithm by operating its antenna array 410-1-410-L, receiver circuit 409, control circuit 413, process/arithmeric circuit 406 together. As a result, data strings shown in FIG. 9 can be obtained.

Figure 9:
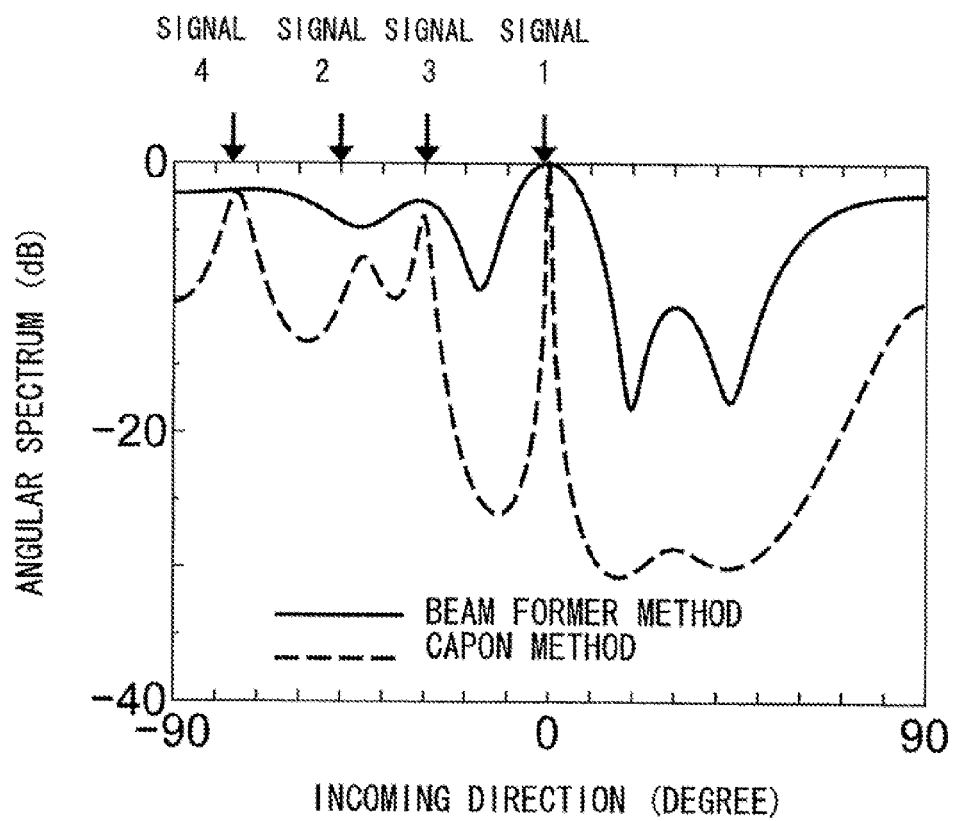
FIG. 9 is a graph showing an example of an angle profile obtained during control procedure in accordance with an exemplary aspect of the present invention.

In general, there is no clear relation between the incoming directions in the horizontal axis in FIG. 7 and those in FIG. 9. However, since four signals shown in FIG. 7 and the corresponding four signals shown in FIG. 9 propagate through the same paths in the opposite directions, the propagation losses are substantially equal to each other, and therefore the relation of their power is maintained. Note that in this example, an assumption is made that the distance between the antenna array 405-1-405-M of the transmitter 401 and the antenna array 411-1-411-N of the receiver 402 in the transmitting/receiving device 400 is negligible since it is considerably smaller than the distances of the propagation paths. Similarly, an assumption is also made that the distance between the antenna array 505-1-505-K of the transmitter 501 and the antenna array 511-1-511-L of the receiver 502 in the transmitting/receiving device 500 is negligible since it is considerably smaller than the distances of the propagation paths. These assumptions hold in ordinary propagation environment. Furthermore, the present invention is also applicable to transmitting/receiving devices having such a configuration that a common antenna array is used for both transmission and reception. In such configurations, the above-described assumption is unnecessary.

The process/arithmetic circuit 406 identifies signals in order of the received power by performing peak searches using the data string of the obtained angular spectrum. In this process, it is possible to terminate the identification process at the point when a predetermined number of signals are identified. Next, the process/arithmetic circuit 406 calculates AWVs with which the main beam or a sub-beam is pointed to the incoming direction of each signal, and stores these AWVs in the storage circuit 408 in order of the received power. In this process, AWVs for the AWV control circuits 410-1-419-N of the receiver 402 and AWVs for the AWV control circuits 404-1-404-M of the transmitter 401 are both calculated. When the transmitting/receiving device 400 is operated in the receiving mode, the former is used, and when it is operated for transmission, the latter is used. Furthermore, instead of newly calculating AWVs, it is possible to select AWVs with which the main beams or a sub-beam is pointed to the corresponding incoming direction from the AWVs that were used in the beam scan process.

The transmitting/receiving devices 400 and 500 select AWVs in the same ranks from the AWVs that are stored in the storage devices 408 and 508 in the above-described method, and begins communication (S13 and S19 in FIG. 1). At this point, when the transmitting/receiving device 400 is operated for transmission, the AWV control circuits 404-1-404-M of the transmitter 401 should be set with an AWV in a predefined rank among the AWVs stored in the storage circuit 408. When the transmitting/receiving device 400 is operated in the receiving mode, the AWV control circuits 410-1-419-N of the receiver 402 should be set with an AWV in a predefined rank among the AWVs stored in the storage circuit 408. A similar setting is made for the transmitting/receiving device 500.

Figure 16:
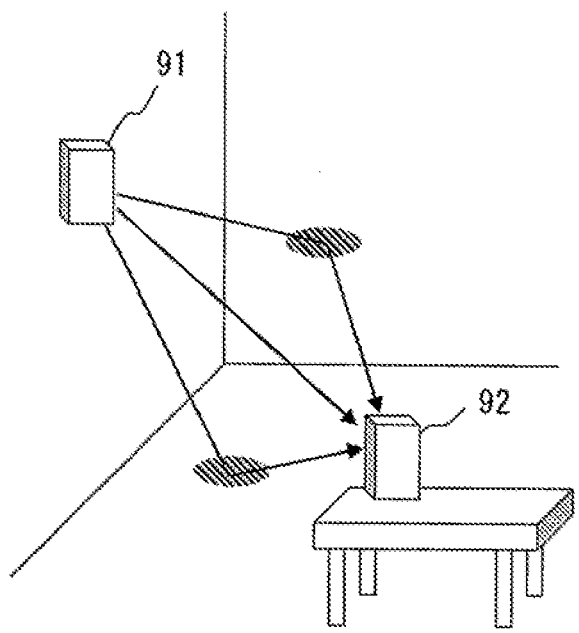
FIG. 16 shows a configuration of a system using wide-angle antennas.
Figure 17:
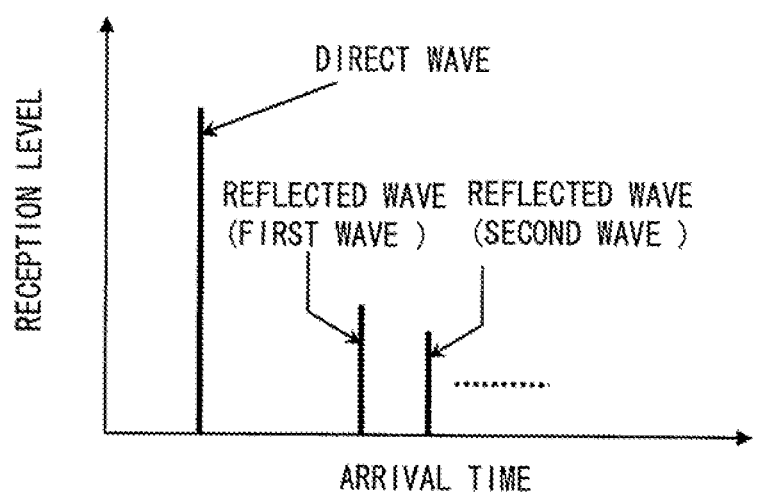
FIG. 17 shows an example of a delay profile of a system using wide-angle antennas when the system is used indoors.

Then, if the communication by the AWV combination that is selected at the early stage is deteriorated, the transmitting/receiving devices 400 and 500 select another AWV combination in the same ranks from the AWVs stored in the storage devices 408 and 508 (S15, FIG. 1), verifies the communication quality (S16 if FIG. 16), and adopts that candidate when the candidate has satisfactory quality (transition from S13 to S14). In the above processes, the selection of AWVs is preferably carried out, for example, in the order in which the AWVs are stored, i.e., in the order of received power at the initial training.

Figure 10:
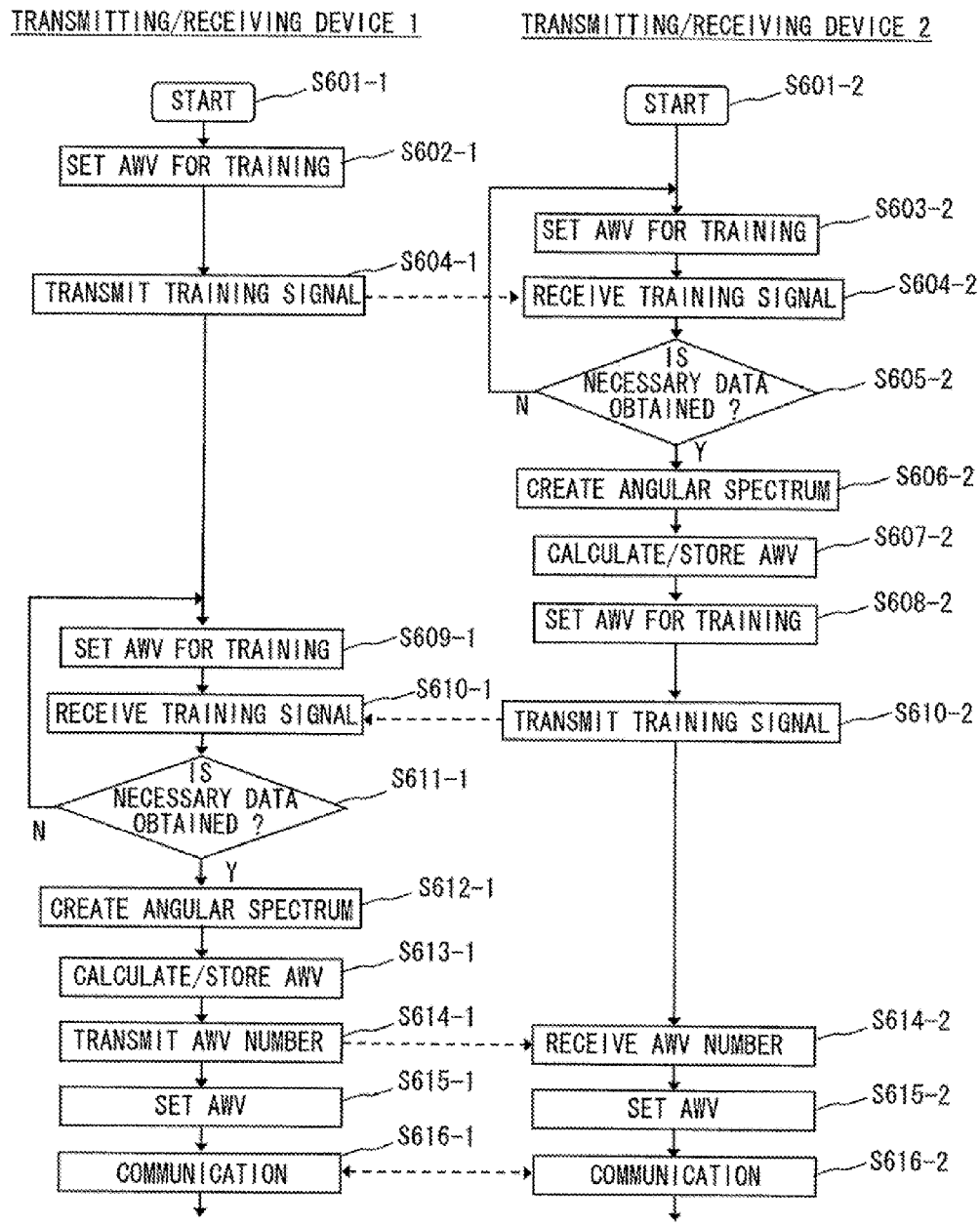
FIG. 10 is a sequence diagram illustrating operations of a transmitter and a receiver that are carried out before actual wireless communication in radio control procedure in accordance with a first exemplary embodiment of the present invention.

Next, details of the operations of the transmitting/receiving devices 400 and 500 carried out in state transition processes shown in FIG. 1 are explained hereinafter. FIG. 10 is a sequence diagram illustrating operations of the transmitting/receiving devices 400 and 500 in the transition processes from S11 to S13 in FIG. 1, i.e., the processes from the initial training to the beginning of actual wireless communication. When the transmitting/receiving device 400 is operated for transmission and the transmitting/receiving device 500 is operated in the receiving mode, the transmitting/receiving device 400 transmits input data from outside to the transmitting/receiving device 500 in the normal communication. Meanwhile, in the training, the process/arithmetic circuit 406 causes the transmitter circuit 403 to output a signal for training (hereinafter called "training signal"). As a result, in the training, a training signal is transmitted from the transmitting/receiving device 400 to the transmitting/receiving device 500. Similar operations are carried out in the reversed case, i.e., the case where the transmitting/receiving device 400 is operated in the receiving mode and the transmitting/receiving device 500 is operated for transmission. It should be noted that the transmitting/receiving devices 400 and 500 are denoted as "transmitting/receiving device 1" and "transmitting/receiving device 2" respectively in FIGS. 10 to 14.

Each step in the sequence diagram shown in FIG. 10 is explained hereinafter. Firstly, the transmitting/receiving device 400 (the transmitting/receiving device 1 in FIG. 10) sets an AWV to a value for training, i.e., a value for generating an omni or quasi-omni pattern (S602-1), and transmits a training signal (S604-1). The transmitting/receiving device 500 (the transmitting/receiving device 2 in FIG. 10) repeatedly receives the training signal (S604-2) while changing the AWV (S603-2) until the signal reception in all the predetermined AWV settings are completed (S605-2).

Then, the transmitting/receiving device 500 creates an angular spectrum, i.e., a data string indicating a relation between received power and incoming directions of the received signals from the measurement result of the signals (S606-2). Next, the transmitting/receiving device 500 identifies signals in order of the received power by performing peak searches using the data string of the angular spectrum. In this process, it is possible to terminate the identification process at the point when predetermined number of signals are identified. Then, the transmitting/receiving device 500 calculates AWVs with which the main beam or a sub-beam is pointed to the incoming direction of each signal, and stores these AWVs in order of the received power (S607-2).

Next, the roles of the transmitting/receiving devices 400 and 500 are interchanged, and similar processes are performed. That is, the transmitting/receiving device 500 sets an AWV to a value for training, i.e., a value for generating an omni or quasi-omni pattern (S608-2), and transmits a training signal (S610-2). The transmitting/receiving device 400 repeatedly receives the training signal (S610-1) while changing the AWV (S609-1) until signal reception in all the predetermined AWV settings are completed (S611-1). Then, the transmitting/receiving device 400 creates an angular spectrum, i.e., a data strings indicating a relation between received power and incoming directions of the received signals from the measurement result of the signal (S612-1). Next, the transmitting/receiving device 400 identifies signals in order of the received power by performing peak searches using the data string of the angular spectrum. In this process, it is possible to terminate the identification process at the point when a predetermined number of signals are identified. Then, the transmitting/receiving device 400 calculates AWVs with which the main beam or a sub-beam is pointed to the incoming direction of each signal, and stores these AWVs in order of the received power (S613-1).

To prepare for entering the communication state, the transmitting/receiving device 400 transmits an AWV number (S614-1), and the transmitting/receiving device 500 receives this number (S614-2). The AWV number is the order of the AWVs, which are stored in the order of the received power at the training. By combining AWVs in the same ranks in the transmitting/receiving device 400 and the transmitting/receiving device 500, it is possible to form a beam that is directed in a common propagation path. The AWV number may be transmitted in the opposite direction, i.e., from the transmitting/receiving device 500 to the transmitting/receiving device 400. The selection of this AWV number is preferably carried out, for example, in the order of storage, i.e., in the order of the received power. Next, the transmitting/receiving devices 400 and 500 set their own AWV control circuits with AWVs corresponding to the AWV number (S615-1 and S615-2). With these processes, they become ready for communication (S616-1 and S616-2).

Figure 11:
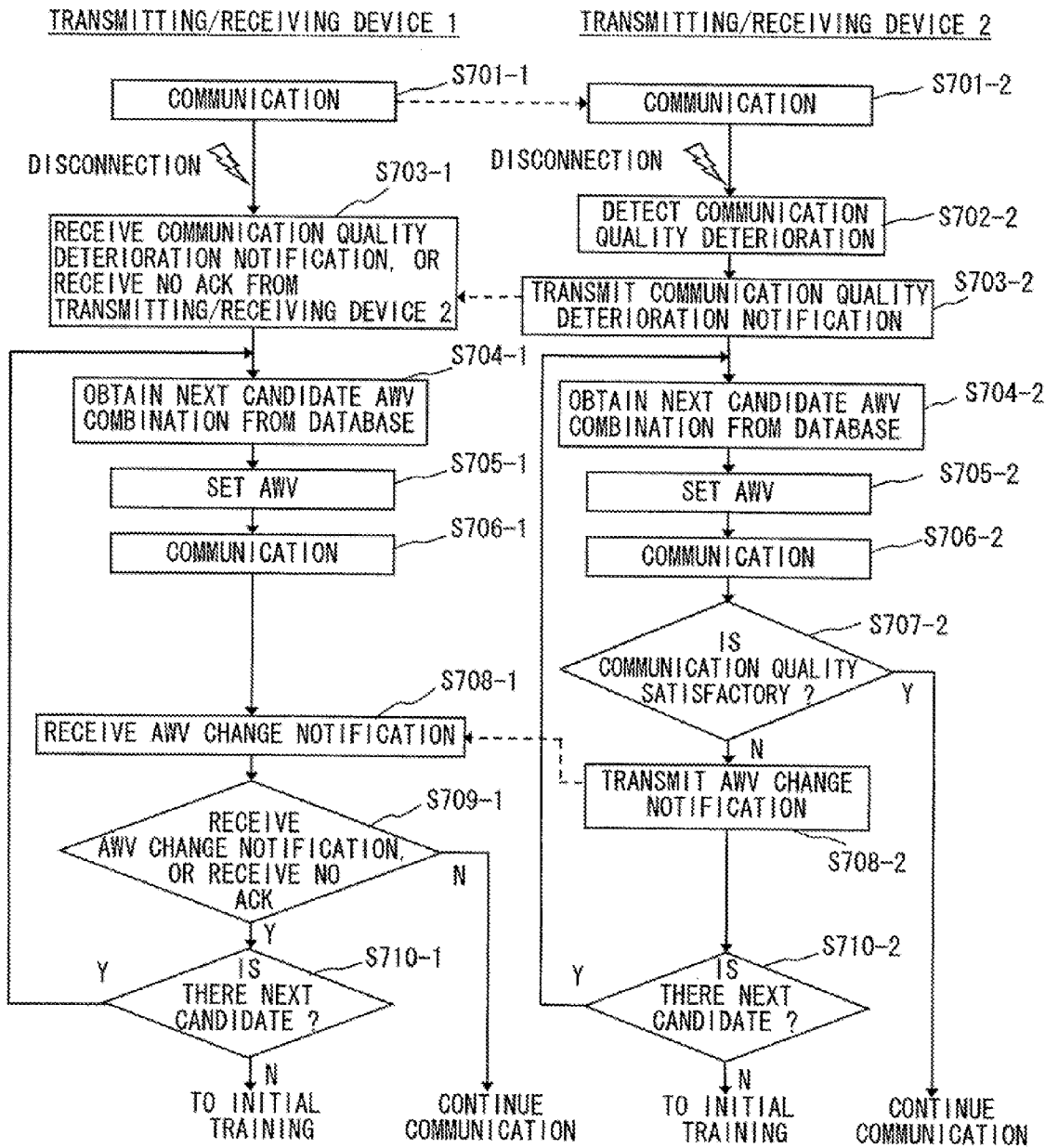
FIG. 11 is a sequence diagram illustrating operations of a transmitter and a receiver that are carried out when shielding of wireless communication occurs in radio control procedure in accordance with a first exemplary embodiment of the present invention.

Next, operations in a case where deterioration in the communication quality such as disconnected communication or the like occurs are explained with reference to FIG. 11. FIG. 11 is a sequence diagram illustrating operations of the transmitting/receiving devices 400 and 500 in transition processes from S14 to S16 in FIG. 1. Note that in the following explanation, a case where the transmitting/receiving device 400 (transmitting/receiving device 1 in FIG. 11) is operated for transmission and the transmitting/receiving device 500 (transmitting/receiving device 2 in FIG. 11) is operated in the receiving mode.

When a problem such as disconnected communication occurs, the transmitting/receiving device 500, which is operating for reception, detects deterioration in the communication quality (S702-R), and notifies it to the transmitting/receiving device 400. Although the transmitting/receiving device 400, which is operating for transmission, receives the notification of the deterioration in the communication quality, it can also recognize the disconnected communication (or deteriorated communication state) by the fact that an ACK signal, which would be otherwise transmitted from the transmitting/receiving device 500 upon successful reception of data in a normal communication state, is not received. At this point, the transmitting/receiving devices 400 and 500 obtain their respective next candidates for AWVs from their own common databases (S704-T and S704-R).

In a step S705-T, the transmitting/receiving device 400 sets the AWV control circuits 404-1-404-M with the next candidate AWVs. Similarly, in a step S705-R, the transmitting/receiving device 500 sets the AWV control circuits 510-1-510-L with the next candidate AWVs. After that, the transmitting/receiving devices 400 and 500 resume the communication (S706-T and S706-R). After the communication is resumed, the transmitting/receiving device 500 verifies the communication quality (S707-R). When the communication quality is satisfactory, the communication is continued, but when it is unsatisfactory, the transmitting/receiving device 500 transmits a notification for AWV change (S708-R). The transmitting/receiving device 400 continues the communication without any change unless the transmitting/receiving device 400 receives a notification for AWV change or cannot receive an ACK signal from the transmitting/receiving device 500 (S709-T). If the transmitting/receiving device 400 receives a notification for AWV change or cannot receive an ACK signal from the transmitting/receiving device 500, the transmitting/receiving devices 400 and 500 attempt communication with a next candidate AWV combination as long as there is another candidate AWV combination (S710-T and S710-R). If the communication quality cannot be improved with any of the candidate phase combinations stored in the storage devices 408 and 508 and there is no additional candidate, the transmitting/receiving devices 400 and 500 returns to the initial training.

Incidentally, although the training in the transmitting/receiving device 500 precedes the training in the transmitting/receiving device 400 in the exemplary embodiment in FIG. 10, the training may be carried out in the transmitting/receiving device 400 before the training in the transmitting/receiving device 500. Furthermore, although the creations of angular spectra and the AWV calculations/storages are carried out in their respective transmitting/receiving devices in the exemplary embodiment in FIG. 10, it is possible to carry out all of these processes in either one of the transmitting/receiving devices. For example, data obtained in the training in the transmitting/receiving device 500 may be transmitted to the transmitting/receiving device 400 so that the creation of an angular spectrum and the AWV calculation/storage for the transmitting/receiving device 500 can be carried out in the process/arithmetic circuit 406 of the transmitting/receiving device 400. Furthermore, only the creation of an angular spectrum may be carried out in the transmitting/receiving device 500, and only the AWV calculation/storage is carried out in the transmitting/receiving device 400 after the created angular spectra is transmitted to the transmitting/receiving device 400. In these cases, AWVs themselves may be transmitted from the transmitting/receiving device 400 to the transmitting/receiving device 500, instead of transmitting the AWV number to the transmitting/receiving device 500 (S614-1). Furthermore, when the database is created, AWV combinations that are obtained by a method other than those specifically described in the specification of the present application may be added to the database, and such configurations fall within the scope of this exemplary embodiment of the present invention.

In accordance with this exemplary embodiment of the present invention, when deterioration in the communication quality such as disconnected wireless communication or the like occurs, communication can be resumed swiftly by selecting another candidate AWV combination, which was generated in advance. In other words, since it is unnecessary to carry out training, to implement an incoming direction estimation algorithm, and to generate an AVW combination whenever deterioration in the communication quality occurs in this exemplary embodiment, it is possible to determine a new beam in a very short time. It should be noted that some of incoming direction estimation algorithms require a large calculation amount. However, the incoming direction estimation algorithm is implemented in the initial training in this exemplary embodiment of the present invention. A longer processing time is acceptable in the initial training in comparison to in the situation where communication is recovered after the disconnection of communication, and therefore it will pose little or no problem.

The following is supplementary explanation for the reason why this method is effective for millimeter waves or microwaves that have higher than or equal to around 10 GHz and have a high rectilinear propagation property when used indoors. The propagation paths that can be used for wireless communication are limited. That is, only the direct wave and reflected waves from certain objects such as walls, windows, and furniture can be used. Therefore, angles at which signals should be emitted or angles at which signals should be received are changed depending on the respective signals. Meanwhile, when propagation paths having a low rectilinear propagation property such as a 2.4 GHz micro waveband are used, it is necessary to take effects by multiple scattering and diffraction into consideration, and therefore, in general, directional antennas cannot be used. Therefore, situations are different between communication using microwaves and millimeter waves that have higher than or equal to around 10 GHz and communication using microwaves in the order of 2.4 GHz. It should be noted that there are some examples of development of adaptive antennas having a high directivity fox the purpose of removing interferences even in the field of communication using 2.4 GHz microwaves. However, even if an adaptive-type directional antenna is used, it is relatively easy to ensure satisfactory communication quality at the angle of the direct wave or angles close to it in the 2.4 GHz band since diffraction effects can be expected.

With regard to indoor communication using beam forming in a millimeter waveband, it is necessary to take the following characteristics into consideration. As described above, the number of reflected waves other than the direct wave is limited. Furthermore, even if a certain direct wave or a reflected wave is shielded by an obstacle (e.g., human body), there is no correlation between the shielded certain wave and other waves. Therefore, as described with this exemplary embodiment of the present invention, it is possible to implement communication in a beam direction having the best communication state while ensuring reserve beam directions in a millimeter wave communication system. Meanwhile, when the frequency is lower than around 10 GHz, contribution of multiple reflections and diffractions on the communication quality is large. Therefore, even if a directional antenna is used, the presence/absence of an obstacle changes even the propagation situation of the reserve beam directions. That is, there is a high possibility that the reception state from the reserve beam direction, which has had satisfactory quality without any obstacle, is changed due to the presence of an obstacle. Therefore, it is difficult to obtain an advantageous effect of the present invention in 2.4 GHz microwave communication or the like.

Figure 15A:
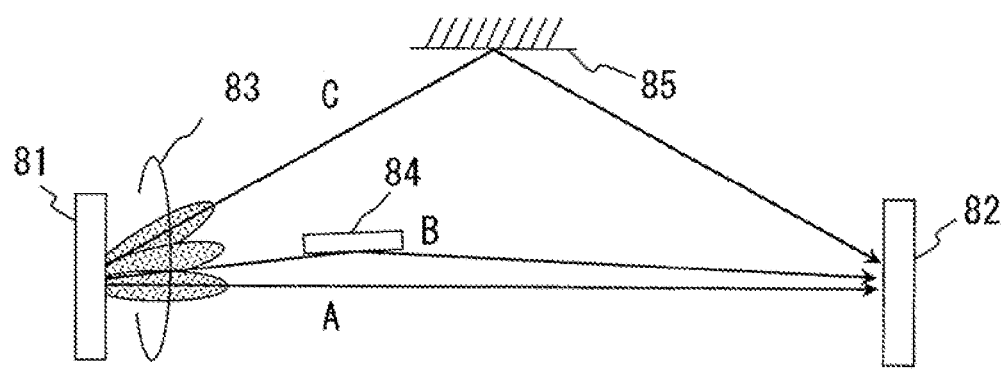
FIGS. 15A and 15B are figures for illustrating aspects where propagation paths are created by the results of local reflections of radio signals in radio control procedure in accordance with a first exemplary embodiment of the present invention.
Figure 15B:
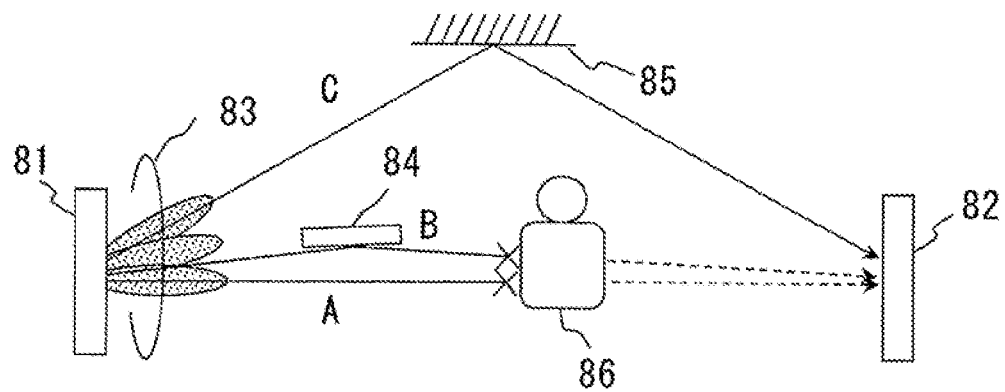

Furthermore, a local reflection may sometimes create a propagation path in millimeter wave communication. FIG. 15 shows an aspect of such a situation. In FIG. 15(a), an assumption is made that there are transmitting/receiving devices 81 and 82, and there are the direct wave A as a propagation path by beam forming, a local reflected wave B, and a reflected wave C through a long path. There is a possibility that the direct wave A and the local reflected wave B are simultaneously shielded, for example, by a human body. To deal with such a problem, Document 1 discloses a technique in which a beam direction in the vicinity of another beam direction to which priority order was already assigned has no or lower priority order. Although examples in which priority order is assigned to AWV combinations in the order of received power has been described so far in the above explanation, it is also possible to take an angular relation between candidate beams into consideration in addition to the criterion based on the received power when priority order is determined. Since information about angular relations between candidate beams in the respective transmitting/receiving devices have been already acquired in this exemplary embodiment of the present invention, such priority order assignment becomes possible.

In the above explanation, AWV combinations that are to be established in the transmitting/receiving devices 400 and 500 are combined using clues about the order of received power at the initial training. However, if two or more propagation paths have propagation losses close to each other, or if the quasi-omni pattern has low accuracy, i.e., there are variations between the antenna gains depending on the emitting direction or in a similar situation, there is a possibility that an error occurs in the AWV combinations. The error in the above explanation means a situation where AWVs each corresponding to a different propagation path are combined. However, even if such an error occurs, verification is carried out on the quality in the step S16 in FIG. 1, and when such an error occurs in the combination, the process goes to the state S15 in order to select another AWV combination. Therefore, critical situations such as a situation where the communication is disconnected for a long time or completely stopped can be avoided. Different countermeasure for such AWV combination errors will be described later with a fifth exemplary embodiment of the present invention.

In the above explanation, an AWV of the transmitting/receiving device operating for transmission is established in an omni or quasi-omni pattern. However, if the generation of an omni or quasi-omni pattern is very difficult, other fixed patterns may be used as a substitute. That is, a beam pattern in which the antenna gain of a fixed pattern beam has directional dependence may be also used. However, it is necessary to use a pattern having an antenna gain over a sufficiently wide angle range. In such a case, only requirement is to add a process to remove effects by the directional dependence of the antenna gain of a fixed pattern beam from the angular spectrum obtained by the above-described method. In that process, if necessary, a data string describing the directional dependence of the antenna gain of a fixed pattern beam may be transmitted/received between the transmitting/receiving devices.

In the above explanation, beam forming between two transmitting/receiving devices is explained. Operations like this are often carried out between two transmitting/receiving devices in a system including three or more transmitting/receiving devices. In general, there is a transmitting/receiving device having special authority called a Piconet coordinator or an access point in such a system. The decision on which two transmitting/receiving devices carry out a beam forming operation therebetween is typically made by instructions from the transmitting/receiving device having special authority called a Piconet coordinator or an access point. Only requirement for the Piconet coordinator or access point is to receive requests from other general transmitting/receiving devices and issue these instructions.

Furthermore, in this exemplary embodiment of the present invention, similar processes are also performed between two transmitting/receiving devices in a state where roles of them are interchanged. In these operations, the decision on which of two transmitting/receiving devices performs which of the roles in the earlier state may be also made by instructions from the transmitting/receiving device having special authority called a Piconet coordinator or an access point.

Furthermore, although expressions such as "to operate a transmitting/receiving device for reception" and "to generate an omni (nondirectional) or quasi-omni (pseudo-nondirectional) pattern" are used in the above explanation, these processes are carried out in accordance with schedules that are embedded in advance in the process/arithmetic circuits of the respective transmitting/receiving devices.

<Second Exemplary Embodiment>

A second exemplary embodiment of the present invention is explained hereinafter with reference to a transition diagram shown in FIG. 2. It should be noted that a configuration similar to the one shown in FIG. 5 can be used as a configuration of the wireless communication system in accordance with this exemplary embodiment of the present invention. Each of states S21 to S26 and transition conditions therebetween are similar to the states S11 to S16 and their transition conditions shown in FIG. 1, which are described with a first exemplary embodiment. Therefore, detailed explanation about the states S21 to S26 is omitted.

Figure 2:
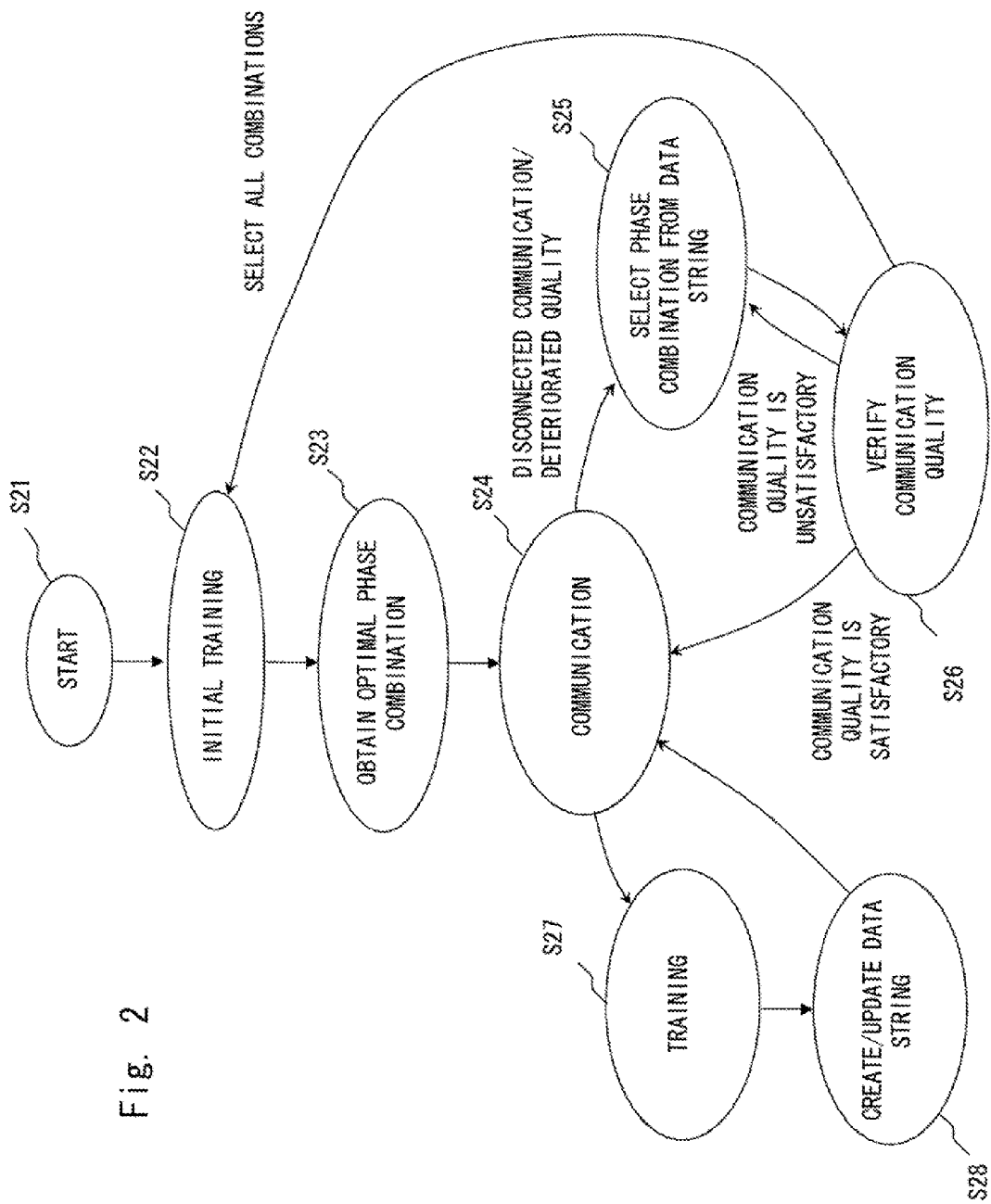
FIG. 2 shows transitions in radio control procedure in accordance with a second exemplary embodiment of the present invention.

In a state S27 in FIG. 2, additional second training is carried out after the process transfers from the state where the communication is maintained (S24). The second training may be periodically carried out, or may be carried out as appropriate during idle times in which there is no data to be transmitted/received.

In a state S28, the process/arithmetic circuit 406 and 506 re-calculate a plurality of candidate AWV combinations. The process/arithmetic circuits 406 and 506 update the data strings in the storage devices 408 and 508 with the plurality of candidate AWVs obtained by the re-calculation.

In this exemplary embodiment of the present invention, the plurality of AWV combinations are periodically or appropriately updated by examining situations with regard to reserve beam directions in the second training. In this way, a wireless communication system in accordance with this exemplary embodiment of the present invention can ensure AWV combinations that are constantly updated to the latest state. Note that the second training (S27) may be divided and carried out in the intervals between the communication. In this way, it can eliminate the necessity to suspend the communication for a long time. Furthermore, when the communication is disconnected or the communication quality is deteriorated, it is desired to recover the communication in a short time. However, since this second training does not need to be carried out immediately, it will not cause any problem even an incoming direction estimation algorithm is implemented.

Furthermore, since this second training often requires less immediacy even in comparison to the initial training, the beam direction scan may be performed with higher angular resolution by changing the AWV of the antenna array. In this way, it is possible to find an AWV combination capable of achieving better communication quality.

Furthermore, the beam direction scan in the second training may be implemented in such a manner that the scan range is limited within ranges close to the incoming directions corresponding to the respective AWV combinations obtained in the initial training. In this way, the search for an AWV combination capable of achieving better communication quality can be performed in a shorter time.

<Third Exemplary Embodiment>

Figure 3:
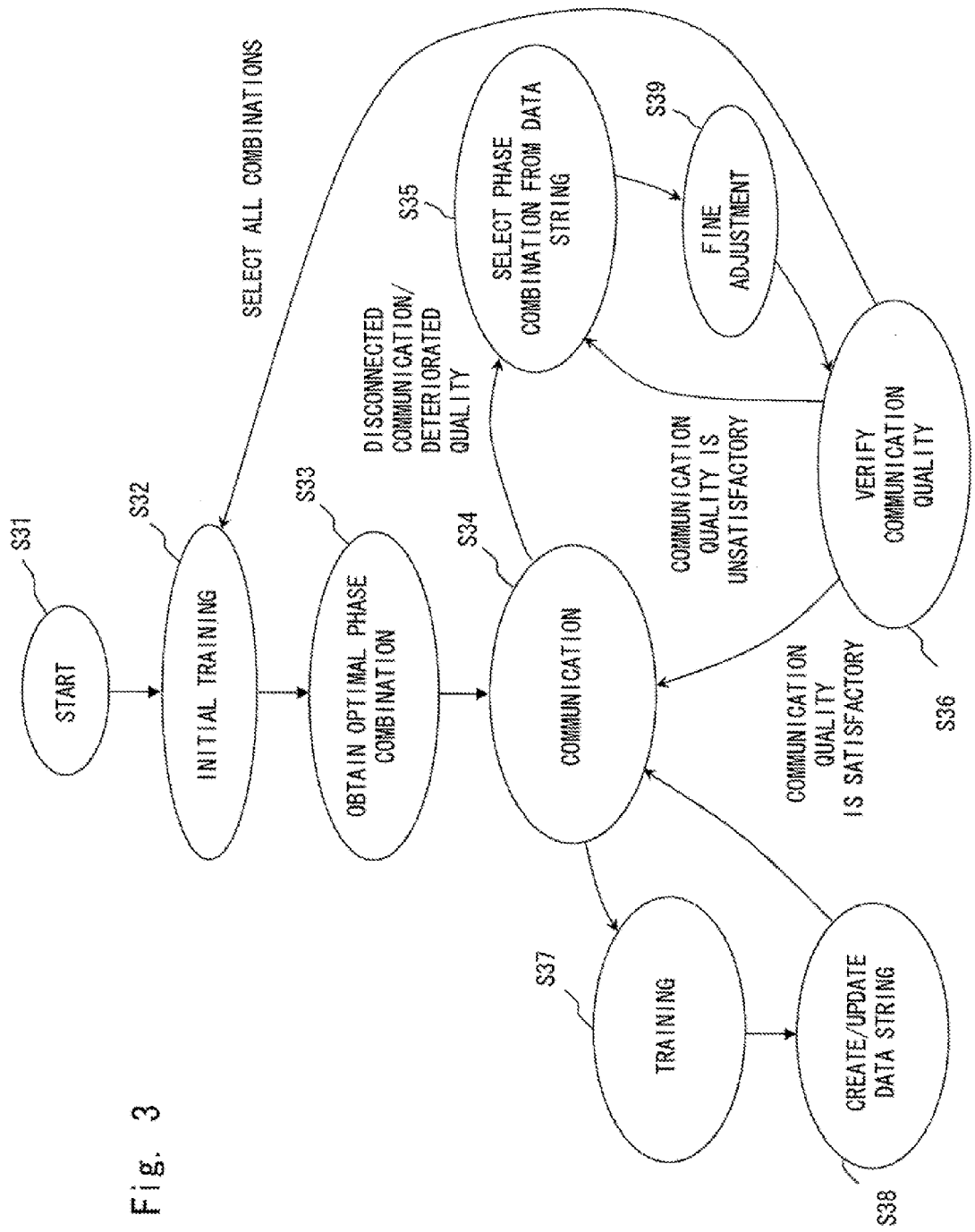
FIG. 3 shows transitions in radio control procedure in accordance with a first exemplary embodiment of the present invention.
Figure 4:
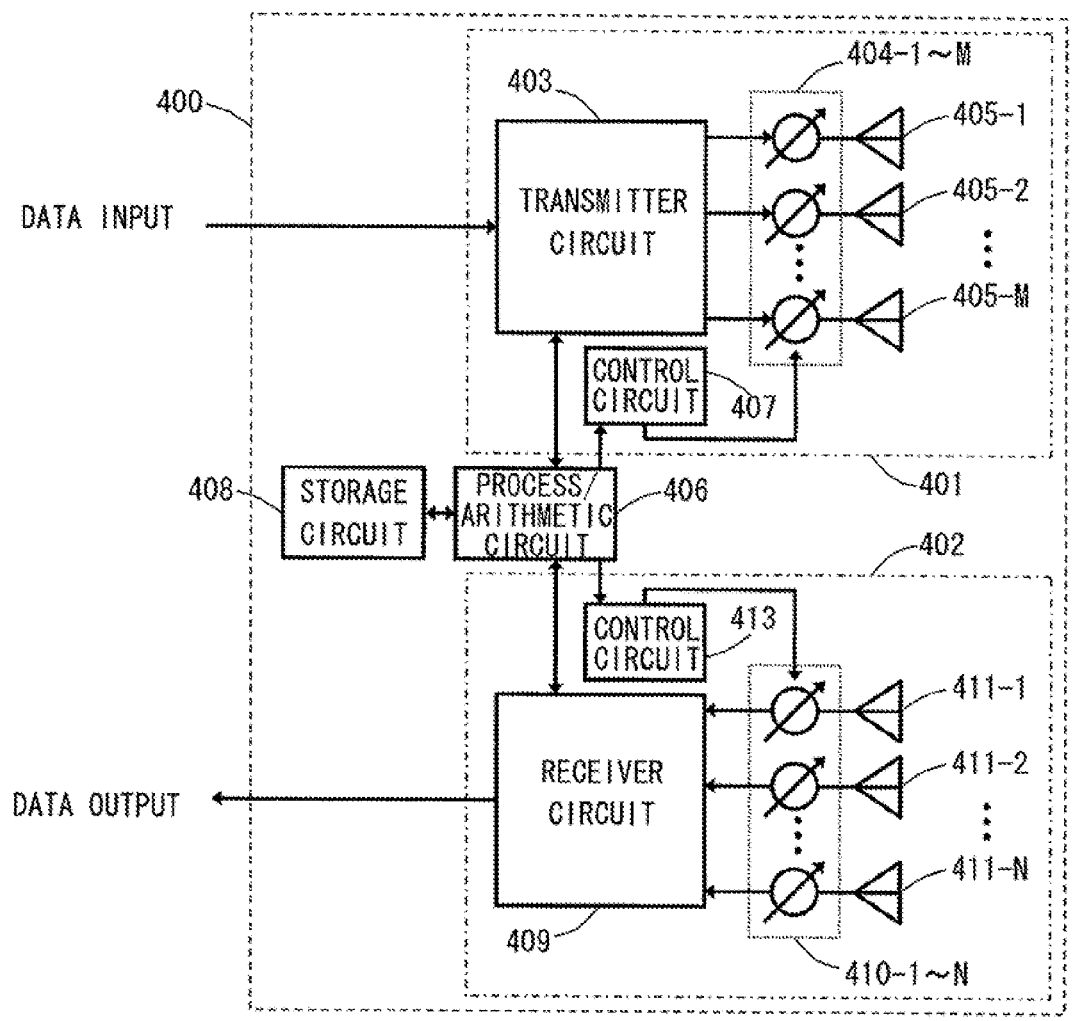
FIG. 4 shows an example of a configuration of an apparatus for use in beam forming to which the present invention is applicable.

A third exemplary embodiment of the present invention is explained hereinafter with reference to a transition diagram shown in FIG. 3. It should be noted that a configuration similar to the one shown in FIG. 5 can be used as a configuration of the wireless communication system in accordance with this exemplary embodiment of the present invention. Furthermore, the operations of a third exemplary embodiment are substantially the same as those of a second exemplary embodiment. That is, each of states S31 to S38 and transition conditions therebetween are similar to the states S21 to S28 and their transition conditions shown in FIG. 2, which are described with a second exemplary embodiment. Therefore, detailed explanation about the states S31 to S38 is omitted.

In this exemplary embodiment of the present invention, when deterioration in the communication quality such as disconnected communication or the like occurs, a next candidate AWV combination is selected from the AWV combinations recorded in the database (S35) and fine adjustment is carried out in that state (S39). This fine adjustment means a method for searching for an optimal beam without taking time. Specifically, adjustment may be carried out by slightly changing the beam or the established AWV so that better communication quality is obtained. Furthermore, simplified beam searching procedure such as "Beam Tracking" shown in Document 4 may be applied. Furthermore, processes similar to those of the initial training may be carried out with higher angular resolution within ranges close to the incoming directions corresponding to the newly selected AWV combinations.

For example, if the AWV combination is shifted from an AWV combination corresponding to larger received power to an AWV combination corresponding to smaller received power as described in detail with a first exemplary embodiment of the present invention, the received power becomes gradually smaller, and therefore the accuracy could deteriorate. Accordingly, it can provide an advantageous effect that an AWV combination enabling stable transmission with high accuracy is found by carrying out fine adjustment in an optimal state, for example, by carrying out gain adjustment for a receiving operation in a state where the received power is weakened by shielding of wireless communication.

<Fourth Exemplary Embodiment>

A fourth exemplary embodiment of the present invention is characterized in that the training and the acquirement/establishment of AWV combinations are performed at a low rate (with a narrow band) and actual communication is performed at a relatively high rate (with a wide band). The other operations may be carried out by using a method described with one of first to third exemplary embodiments of the present invention.

Since free space propagation losses are large in millimeter wave communication, the received power is expected to be small. Therefore, if an AWV on the transmission side are established so as to generate an omni or quasi-omni pattern in the training, there is a possibility that a sufficient CNR (Carrier to Noise Ratio) is not achieved. Accordingly, it is expected that the use of the low rate (narrow band) having better reception sensitivity provides advantageous effects such as enabling the training and improving the accuracy. It should be noted that the use of low rate (narrow band) means to narrow the frequency band used to transmit a training signal in order to narrow the noise bandwidth or to adopt a modulation technique having a small necessary CNR. Note that "to adopt a modulation technique having a small necessary CNR" means, in other words, to adopt a modulation technique having a large distance between signal points on the constellation (typically a smaller transmission speed). It should be noted that it is assumed that a narrow beam width is used in this exemplary embodiment of the present invention, and therefore there is no significant difference in optimal beam (AWV) combinations regardless of whether the transmission is a low rate (narrow band) or a high rate (wide band) since the correlative bandwidth is wide.

<Fifth Exemplary Embodiment>

As stated in the last part of the explanation of a first exemplary embodiment of the present invention, in a case where AWV combinations to be established in the transmitting/receiving devices 400 and 500 are created by using clues about the order of received power at the initial training, when two or more propagation paths have propagation losses close to each other or when the quasi-omni pattern has low accuracy, i.e., there are variations between the antenna gains depending on the emitting direction or in a similar situation, there is a possibility that an error occurs in the AWV combinations. The error in the above explanation means a situation where AWVs each corresponding to a different propagation path are combined. It is believed that the possibility of such errors depends on the propagation environment. It is desirable to apply procedure described with this exemplary embodiment of the present invention to cases where errors occur with high frequency.

Figure 12A:
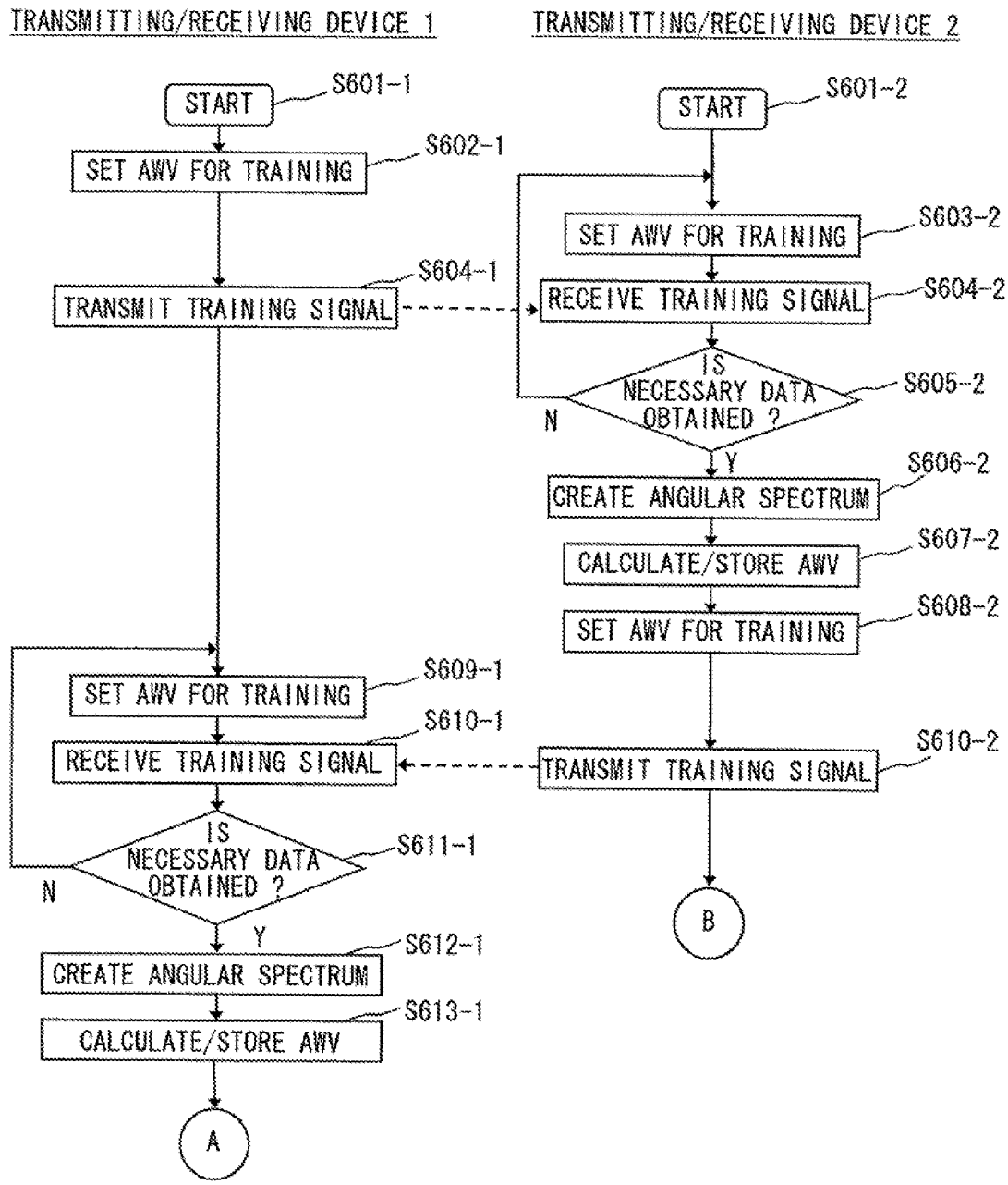
FIGS. 12A and 12B are a sequence diagram illustrating operations of a transmitter and a receiver that are carried out before actual wireless communication in radio control procedure in accordance with a fifth exemplary embodiment of the present invention.
Figure 12B:
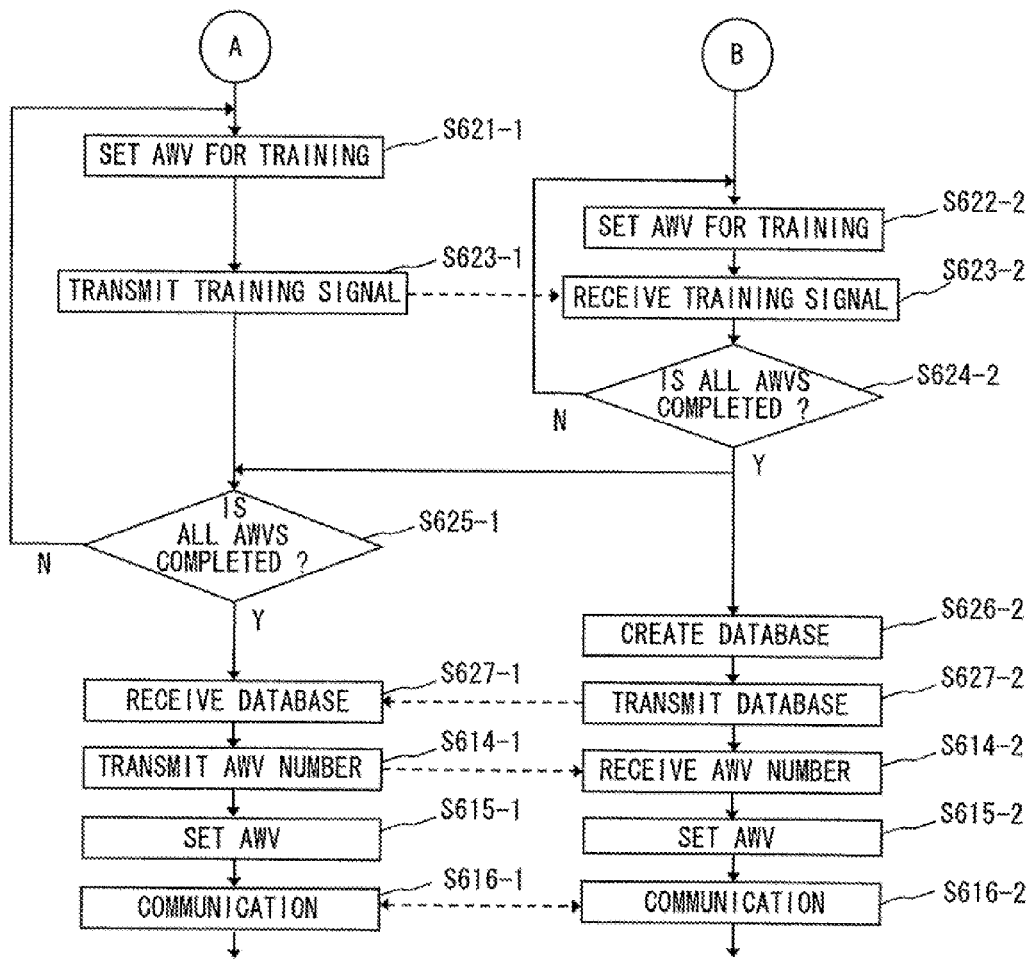
Figure 13:
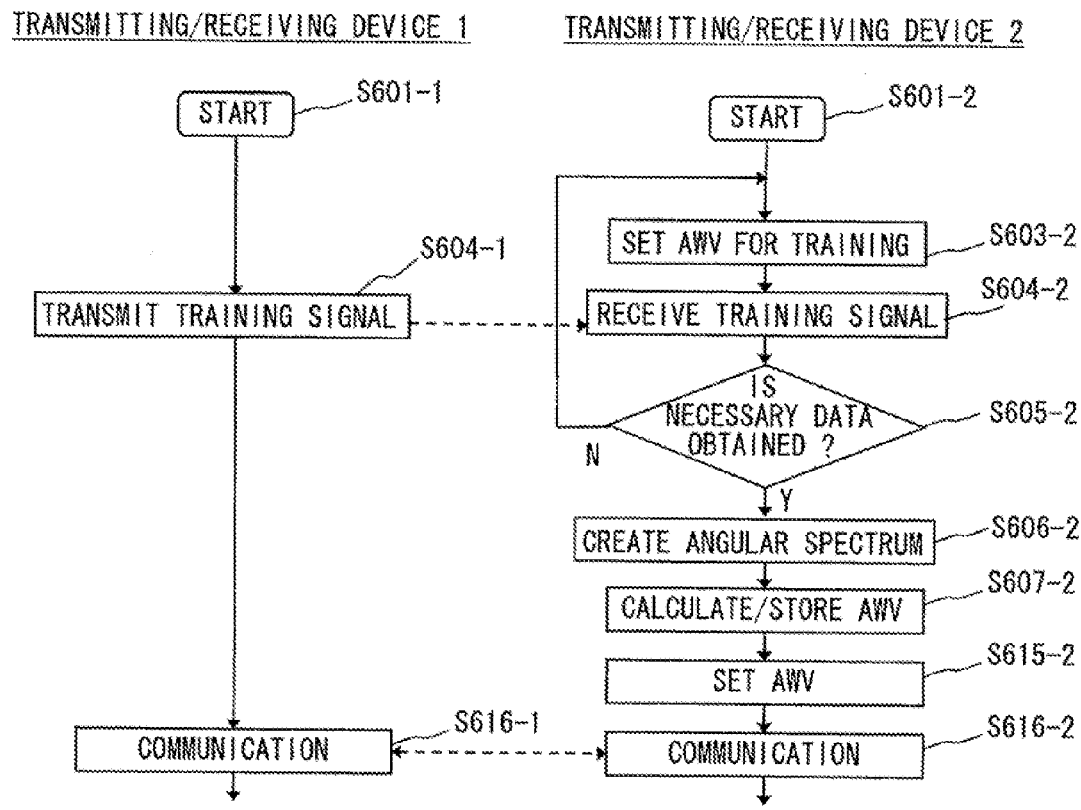
FIG. 13 is a sequence diagram illustrating operations of a transmitter and a receiver that are carried out before actual wireless communication in radio control procedure in accordance with a sixth exemplary embodiment of the present invention.

This exemplary embodiment of the present invention is characterized in that, instead of combining AWV combinations between the transmitting/receiving devices by using clues about the order of received power at the initial training, training is performed for all the recorded AWV combinations for both the transmitting/receiving device 400 and for the transmitting/receiving device 500 in order to ensure AWV combinations having satisfactory communication quality. FIGS. 12A and 12B show an example of a sequence diagram.

FIGS. 12A and 12B indicate a modified sequence diagram of the sequence diagram shown in FIG. 10, and has additional steps S621 to S627 between the steps S613 and S614. In steps S621-1, S623-1 and S625-1, the transmitting/receiving device 400 sets a plurality of AWVs stored in the storage circuit 408 one by one, and transmits training signals. In steps S622-2 to S624-2, the transmitting/receiving device 500 sets a plurality of AWVs stored in the storage circuit 508 one by one, and carries out receiving processes for signals transmitted from the transmitting/receiving device 400. After the transmission/reception of the training signals for all the AWV combinations has been completed, the transmitting/receiving device 500 determines an AWV for reception having the best communication quality for each AWV for transmission used in the transmitting/receiving device 400. Then, the transmitting/receiving device 500 creates a data string (database) indicating combinations of AWVs having satisfactory communication quality (S626-2), and transmits the data string (database) indicating the combinations of AWVs having satisfactory communication quality (S627-2). The transmitting/receiving device 400 updates the AWV information stored in the storage circuit 408 by using the database received from the transmitting/receiving device 500 (S627-1).

In general, it is unrealistic, in terms of processing time, to measure communication quality for all the AWV combinations between a plurality of transmitting/receiving devices. However, since the number of candidate AWVs is reduced to a small number through the processes up to S613-1 in this exemplary embodiment of the present invention, the processing time required to measure communication quality for all the combinations can be reduced. For example, in a case where there are four propagation paths as the example shown in FIGS. 6 to 9, the number of all the AWV combinations is 16 at the most.

Furthermore, the above-described procedure to measure communication quality for all the AWV combinations may be modified as mentioned below in order to reduce the processing time. Firstly, AWV combinations to be established in the transmitting/receiving devices 400 and 500 are determined by using clues about the order of received power at the initial training or the order of other communication quality in accordance with procedure described above with a first exemplary embodiment. Next, tests are carried out on these AWV combinations with regard to communication quality, and only the AWV combinations that do not satisfy a predetermined communication quality criterion are temporarily cancelled. Then, with regard to the AWV combinations that are cancelled because of their communication quality lower than the communication quality criterion, searches for new AWV combinations are performed by carrying out tests on all the combinations for communication quality. After that, priority order of AWV combinations may be determined again based on the above-described two sets of communication quality tests. By adopting a method like this, the acceptable AVW combinations among the AWV combinations determined based on the initial training result can be eliminated from the round-robin-based communication quality measurements that are carried out in order to find new combinations, and thus enabling reduction in processing time.

<Sixth Exemplary Embodiment>

In the above explanation, it is assumed that communication is performed between transmitting/receiving devices that form a directional beam by beam forming. However, each of the above-described exemplary embodiments of the present invention is also applicable to communication between a transmitting/receiving device that forms a fixed beam and a transmitting/receiving device that forms a directional beam by beam forming. Assuming that the transmitting/receiving device 400 is a transmitting/receiving device that forms a fixed beam and the transmitting/receiving device 500 is a transmitting/receiving device that forms a directional beam by beam forming, the training needs to be carried out only for the transmitting/receiving device 500. Therefore, the sequence diagram becomes, for example, the one shown. in FIG. 13.

<Seventh Exemplary Embodiment>

Figure 14:
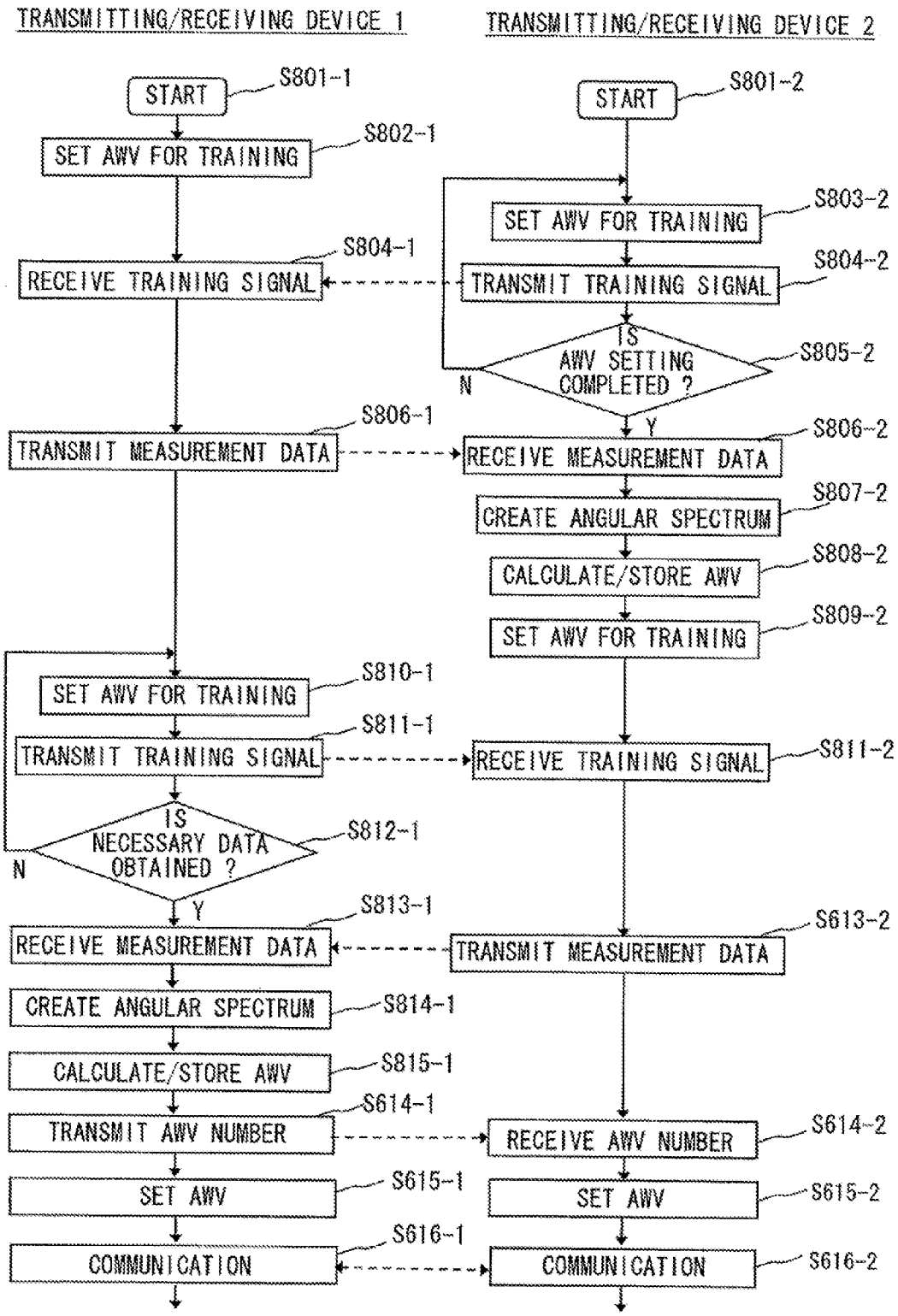
FIG. 14 is a sequence diagram illustrating operations of a transmitter and a receiver that are carried out before actual wireless communication in radio control procedure in accordance with a seventh exemplary embodiment of the present invention.

In the above exemplary embodiments of the present invention, an angular spectrum are created by transmitting training signals from one transmitting/receiving device that generated a quasi-omni pattern and measuring received signals while changing the AWVs in the other transmitting/receiving device in the initial training. However, it is also possible to create an angular spectrum by changing AWVs of one transmitting/receiving device that transmits training signals while measuring received signals in the other transmitting/receiving device that generates a quasi-omni pattern, and then feeding the measured data back to the former transmitting/receiving device. FIG. 14 shows an example of a sequence diagram for such a case.

The transmitting/receiving device 400 (transmitting/receiving device 1 in FIG. 14) establishes an omni or quasi-omni pattern for receiving a training signal from the transmitting/receiving device 500 (transmitting/receiving device 2 in FIG. 14) (S802-1), and receives a training signal (S804-1). The transmitting/receiving device 500 repeatedly transmits training signals (S804-2) while changing AWVs (S803-2) until the reception of training signals in all the predetermined AWV settings are completed (S805-2).

Next, the transmitting/receiving device 400 transmits measurement data indicating the reception quality of the training signals (e.g., received power) to the transmitting/receiving device 500 (S806-1). The transmitting/receiving device 500 receives the measurement data (S806-2), and creates an angular spectrum, which is a data string describing a relation between signal reception characteristics (e.g., received power) at the transmitting/receiving device 400 and signal-emitting directions at the transmitting/receiving device 500, based on the received measurement data and the AWVs used in the transmitting/receiving device 500 for the transmission (S807-2). Next, the transmitting/receiving device 500 identifies signals in order of the received power at the transmitting/receiving device 400 by performing peak searches using the data string of the angular spectrum. In this process, it is possible to terminate the identification process at the point when a predetermined number of signals are identified. Next, the transmitting/receiving device 500 calculates AWVs with which the main beam or a sub-beam is pointed to the emitting direction of each signal, and stores these AWVs in order of the received power at the transmitting/receiving device 400 (S808-2).

Processes from S809-2 to S815-1 shown in FIG. 14 are inverted processes of the above described processes from S802-1 to 5808-2. Accordingly, they may be performed by carrying out the processes from S802-1 to S808-2 in a state where the roles of the transmitting/receiving devices 400 and 500 are interchanged with each other.

<Eighth Exemplary Embodiment>

In a first exemplary embodiment of the present invention, an assumption is made that the distance between the antenna array 405-1-405-M of the transmitter 401 and the antenna array 411-1-411-N of the receiver 402 in the transmitting/receiving device 400 is negligible since it is considerably smaller than the distances of the propagation paths. Similarly, an assumption is also made that the distance between the antenna array 505-1-505-K of the transmitter 501 and the antenna array 511-1-511-L of the receiver 502 in the transmitting/receiving device 500 is negligible since it is considerably smaller than the distances of the propagation paths. However, these assumptions about distances between transmission/reception antennas are unnecessary when the following procedure is taken.

(a) One of the transmitting/receiving devices (e.g., transmitting/receiving device 400) is operated for transmission, and after a quasi-omni pattern is established in its antenna array, training signals are transmitted.

(b) The other transmitting/receiving device (e.g., transmitting/receiving device 500) is operated in the receiving mode, and a beam direction is scanned by changing the AWV of its antenna array.

(c) A data string describing a relation between an incoming direction and a received-signal characteristic at the transmitting/receiving device 500 is obtained based on a reception result of the training signal in the transmitting/receiving device 500.

(d) The transmitting/receiving device 500 is operated in the receiving mode, and a quasi-omni pattern is established in its antenna array.

(e) The transmitting/receiving device 400 is operated for transmission, and a beam direction is scanned by changing the AWV of its antenna array.

(f) A data string describing a relation between the emitting directions of signals at the transmitting/receiving device 400 operating for transmission and received-signal characteristics at the opposed transmitting/receiving device 500 is obtained by feeding a reception result of the training signal in the transmitting/receiving device 500 operating for reception back to the transmitting/receiving device 400.

By using the above-described result, it is possible to obtain candidate AWV combinations for the transmitter of the transmitting/receiving device 400 and the receiver of the transmitting/receiving device 500. By carrying out the processes from (a) to (f) for a receiver of the transmitting/receiving device 400 and a transmitter of the transmitting/receiving device 500, it is possible to obtain candidate AWV combinations for the receiver of the transmitting/receiving device 400 and the transmitter of the transmitting/receiving device 500.

Incidentally, the term "communication quality" has been used in the above-described eight exemplary embodiments of the present invention. The communication quality may be, for example, any communication quality such as a received-signal level, an SNR (Signal to Noise Ratio), a BER (Bit Error Rate), a PER (Packet Error Rate), and a FER (Frame Error Rate), and one or more than one of them may be used. Furthermore, a certain data string in a preamble contained in a transmission data string of the transmitter 401 or transmitter 501 may be used for the evaluation of communication quality.

Furthermore, controls and arithmetic operations for the generation/switching of candidate AWVs that are carried out in the transmitting/receiving device 400 in the above-described exemplary embodiments of the present invention can be also implemented by executing computer programs for transmitter/receiver controls in computers such as microprocessors. In the case of a first exemplary embodiment, for example, processes in the steps S703-1 to S705-1 and S708-1 to S710-1 shown in FIG. 11 may be carried out in a computer that executes a transmitter/receiver control program. Similarly, controls and arithmetic operations for the generation/switching of candidate AWVs that are carried out in the transmitting/receiving device 500 can be also implemented by executing computer programs for transmitter/receiver controls in computers such as microprocessors. In the case of a first exemplary embodiment, for example, processes in the steps S702-2 to S705-2 and S707-2 to S710-2 shown in FIG. 11 may be carried out in a computer that executes a transmitter/receiver control program. These programs for transmitter/receiver controls can be stored in various types of storage media, or can be transmitted through communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Furthermore, examples of the communication media include a wire communication medium such as a telephone line, a wireless communication medium such as a microwave line, and the Internet.

Furthermore, in addition to the process/arithmetic circuits 406 and 506, parts of the transmitter circuits 403 and 503 (e.g., modulation process), parts of the receiver circuits 409 and 509 (e.g., demodulation process), digital signal processes of the control circuits 407 and 507 and the like, and other components for equipment controls may be implemented by a computer such as a microcomputer and a DSP (Digital Signal Processor). Furthermore, the so-called "software-antenna technology" may be applied to the transmitting/receiving devices 400 and 500. Specifically, the AWV control circuits 404-1-404-M, 410-1-410-N, 504-1-504-K, and 510-1-510-L may be constructed by digital filters, or a computer such as a DSP.

In the above explanation, situations where communication is performed between two transmitting/receiving devices are explained as examples. However, each of the above-described exemplary embodiments of the present invention is applicable to situations where three or more transmitting/receiving devices perform communication.

In the above explanation, an incoming direction estimation algorithm is implemented in a transmitting/receiving device operating for reception while a transmitting/receiving device operating for transmission generates a quasi-omni pattern. However, when the quasi-omni pattern generated in the transmitting/receiving device cannot cover a sufficient directional range, the above-described procedure may be divided and carried out at multiple stages. That is, after an angular spectrum is obtained by generating a certain quasi-omni pattern, another quasi-omni pattern covering a different directional range is generated and an angular spectrum is obtained again. Finally, a signal may be specified by using a plurality of obtained angular spectra. Note that the term "sufficient directional range" means a directional range covering all the propagation paths used in the communication. Document 13 discloses a method for covering a necessary angular range with a plurality of quasi-omni patterns in such a manner.

In accordance with each of the above-described exemplary embodiments of the present invention, it is possible to find and establish a beam direction(s) having satisfactory communication quality in a short time when wireless communication is implemented by performing beam forming.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A method of controlling a wireless communication system in which a plurality of communication devices perform communication, each communication device having transmission and reception antenna arrays and array weight vector (hereinafter referred to as AWV) control circuits each of which changes at least one of an amplitude and a phase of a signal, the signal being transmitted from a plurality of antenna elements constituting the transmission antenna array or received at a plurality of antenna elements constituting the reception antenna array, the method, when independently controls AWVs of at least two antenna elements among the plurality of antenna elements, comprising:
(a) setting a fixed beam pattern in the transmission antenna array possessed by a first communication device included in the plurality of communication devices, and transmitting a first training signal from the first communication device;
(b) receiving the first training signal in a second communication device included in the plurality of communication devices while scanning a beam direction by changing an AWV of the reception antenna array possessed by the second communication device;
(c) obtaining a first data string describing a relation between an incoming direction and a received-signal characteristic in the second communication device based on a reception result of the first training signal;
(d) obtaining first AWVs having a main beam direction or a sub-beam direction in an incoming direction of plural or single signal in the second communication device, the incoming direction of plural or single signal being determined by using the first data string;
(e) setting a fixed beam pattern in the reception antenna array possessed by the second communication device, and receiving a second training signal from the first communication device;
(f) transmitting the second training signal from the first communication device while scanning a beam direction by changing an AWV of the transmission antenna array possessed by the first communication device;
(g) feeding received signal data indicating a reception result of the second training signal measured in the second communication device back to the first communication device;
(h) obtaining a second data string describing a relation between an emitting direction of a signal in the first communication device and a received-signal characteristic in the second communication device based on a reception result of the second training signal;
(i) obtaining second AWVs having a main beam direction or a sub-beam direction in an emitting direction of plural or single signal in the first communication device, the emitting direction of plural or single signal being determined by using the second data string;
(j) obtaining third AWVs having a main beam direction or a sub-beam direction in an incoming direction of plural or single signal in the first communication device, and forth AWVs having a main beam direction or a sub-beam direction in an emitting direction of plural or single signal in the second communication device,
by carrying out the steps (a) to (i) after the transmitting operation and the receiving operation of the training signal are interchanged between the first and second communication devices; and
(k) using a first AWV combination of one of the first AWVs and one of the second AWVs for first communication between the transmission antenna array of the first communication devices and the reception antenna array of the second communication devices, and using a second AWV combination of one of the third AWVs and one of the fourth AWVs for second communication between the reception antenna array of the first communication devices and the transmission antenna array of the second communication devices.

2. The method of controlling a wireless communication system according to claim 1, wherein the fixed beam pattern is an omni (nondirectional) or quasi-omni (pseudo-nondirectional) pattern.

3. The method of controlling a wireless communication system according to claim 1, wherein the processes to scan a beam direction by changing an AWV of the reception antenna array and to obtain a data string describing a relation between an incoming direction and a received-signal characteristic at the communication device operating for reception in the steps (b) and (c) are carried out by using an incoming direction estimation algorithm.

4. The method of controlling a wireless communication system according to claim 1, wherein the first AWV combination adopted to the first and second communication devices in the step (k) is determined by combining one of the first AWVs and one of the second AWVs that are placed in the same ranks when the first AWVs and the second AWVs are put in the order of received-signal characteristics at the first and second training.

5. The method of controlling a wireless communication system according to claim 4, wherein priority order is assigned to AWV combinations, that is obtained by combining the first AWVs and the second AWVs, in the decreasing order of received-signal characteristics, and the first communication in the step (k) is performed by using an AWV combination selected in accordance with this priority order.

6. The method of controlling a wireless communication system according to claim 1, wherein communication quality is measured for at least a part of a plurality of AWV combinations obtained by combining the first AWVs and the second AWVs, and at least one AWV combination for use in the first communication is selected in advance based on the measured communication quality.

7. The method of controlling a wireless communication system, according to claim 6, wherein priority order is assigned to the AWV combinations in the decreasing order of communication quality, and the first communication is performed by using an AWV combination selected in accordance with this priority order.

8. The method of controlling a wireless communication system according to claim 5, wherein when quality of the first communication between the first and second communication devises are deteriorated, next AWV combination is selected from the AWV combinations in accordance with the priority order, and the first communication is performed by applying the selected AWV combination.

9. The method of controlling a wireless communication system according to claim 1, wherein the received signal characteristic includes at least one of received power, an SNR (Signal to Noise Ratio), a BER (Bit Error Rate), a PER (Packet Error Rate), and a FER (Frame Error Rate).

10. The method of controlling a wireless communication system according to claim 1, wherein:

the first and second communication devices are configured to be able to use a first radio wave containing a signal mainly used for data communication and a second radio wave having a lower data transmission speed or a narrower transmission frequency bandwidth; and transmission and reception of the first training signal in the steps (b) and (c) are carried out by using the second radio wave.

11. The radio control method of controlling a wireless communication system according to claim 3, wherein the incoming direction estimation algorithm is a beam former method, Capon method, a linear estimation method, a minimum norm method, MUSIC (Multiple Signal Classification), or ESPRIT (Estimation of Signal Parameters via Rotational Invariance Techniques).

* * * * *